United States Patent
Kim et al.

(10) Patent No.: US 9,977,590 B2
(45) Date of Patent: May 22, 2018

(54) MOBILE TERMINAL AND METHOD FOR CONTROLLING THE SAME

(71) Applicant: LG ELECTRONICS INC., Seoul (KR)

(72) Inventors: Junghee Kim, Seoul (KR); Yongchul Park, Seoul (KR); Hyunjin An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 14/538,169

(22) Filed: Nov. 11, 2014

(65) Prior Publication Data

US 2015/0169166 A1    Jun. 18, 2015

(30) Foreign Application Priority Data

Dec. 18, 2013 (KR) .................. 10-2013-0158604
Jan. 21, 2014  (KR) .................. 10-2014-0007388

(51) Int. Cl.
| | | |
|---|---|---|
| *H04N 5/232* | (2006.01) | |
| *G06F 3/0482* | (2013.01) | |
| *G06F 3/0488* | (2013.01) | |
| *G06K 9/46* | (2006.01) | |
| *G06K 9/00* | (2006.01) | |
| *G06T 3/40* | (2006.01) | |

(Continued)

(52) U.S. Cl.
CPC .......... *G06F 3/0488* (2013.01); *G06F 3/0485* (2013.01); *G06F 3/04842* (2013.01); *G06F 17/30274* (2013.01); *G06K 9/00288* (2013.01); *G06K 9/4604* (2013.01); *G06T 3/40* (2013.01)

(58) Field of Classification Search
CPC ............ H04N 5/23293; H04N 2101/00; G06F 3/04883; G06F 3/0488
See application file for complete search history.

(56) References Cited

U.S. PATENT DOCUMENTS

| | | | |
|---|---|---|---|
| 6,515,704 B1 * | 2/2003 | Sato ................... | H04N 1/00442 348/333.05 |
| 7,880,792 B2 * | 2/2011 | Yanagi ................ | H04N 1/3875 348/333.01 |

(Continued)

FOREIGN PATENT DOCUMENTS

JP    2006-155109    6/2006

OTHER PUBLICATIONS

European Patent Office Application Serial No. 14192796.2, Search Report dated Jul. 20, 2015, 11 pages.

(Continued)

*Primary Examiner* — Jordany Nunez
(74) *Attorney, Agent, or Firm* — Lee, Hong, Degerman, Kang & Waimey PC

(57) ABSTRACT

A mobile terminal and a method for controlling the same are disclosed. The mobile terminal includes: a display configured to output a specific image in the image view mode; an extractor that extracts a specific area from the specific image, based on a touch gesture on the specific image; and a controller that creates a thumbnail of the specific image from an image of the extracted specific area, and when the image preview function is executed, outputs a thumbnail list that displays the created thumbnail of the specific image to be visually distinct from the thumbnails of other images.

20 Claims, 31 Drawing Sheets

(51) Int. Cl.
*G06F 3/0484* (2013.01)
*G06F 3/0485* (2013.01)
*G06F 17/30* (2006.01)

(56) References Cited

U.S. PATENT DOCUMENTS

| | | | | |
|---|---|---|---|---|
| 9,424,653 | B2* | 8/2016 | Gupta | G06T 7/0085 |
| 2005/0041035 | A1* | 2/2005 | Nagatomo | G06T 3/40 |
| | | | | 345/601 |
| 2007/0035652 | A1* | 2/2007 | Toyoda | G11B 27/005 |
| | | | | 348/333.05 |
| 2008/0225155 | A1* | 9/2008 | Ebato | G11B 27/105 |
| | | | | 348/333.05 |
| 2009/0115863 | A1* | 5/2009 | Lee | G06F 3/04845 |
| | | | | 348/222.1 |
| 2010/0162103 | A1* | 6/2010 | Eom | G06F 3/1253 |
| | | | | 715/255 |
| 2011/0099523 | A1* | 4/2011 | van Zee | G06F 3/04845 |
| | | | | 715/838 |
| 2011/0122153 | A1 | 5/2011 | Okamura et al. | |
| 2011/0246942 | A1* | 10/2011 | Misawa | G06F 3/04815 |
| | | | | 715/830 |
| 2011/0312376 | A1* | 12/2011 | Woo | G06K 9/00295 |
| | | | | 455/556.1 |
| 2013/0077822 | A1* | 3/2013 | Fredlund | G06F 3/1205 |
| | | | | 382/103 |
| 2014/0075354 | A1* | 3/2014 | Ko | G06F 3/04883 |
| | | | | 715/769 |
| 2014/0321770 | A1* | 10/2014 | Potdar | G06T 11/60 |
| | | | | 382/282 |

OTHER PUBLICATIONS

Huang, et al., "An MPEG-7 Based Contentaware Album System for Consumer Photographs," Proceedings of National Computer Symposium, XP007902544, Dec. 2003, 12 pages.
European Patent Office Application Serial No. 14192796.2, Search Report dated Mar. 27, 2015, 6 pages.

* cited by examiner

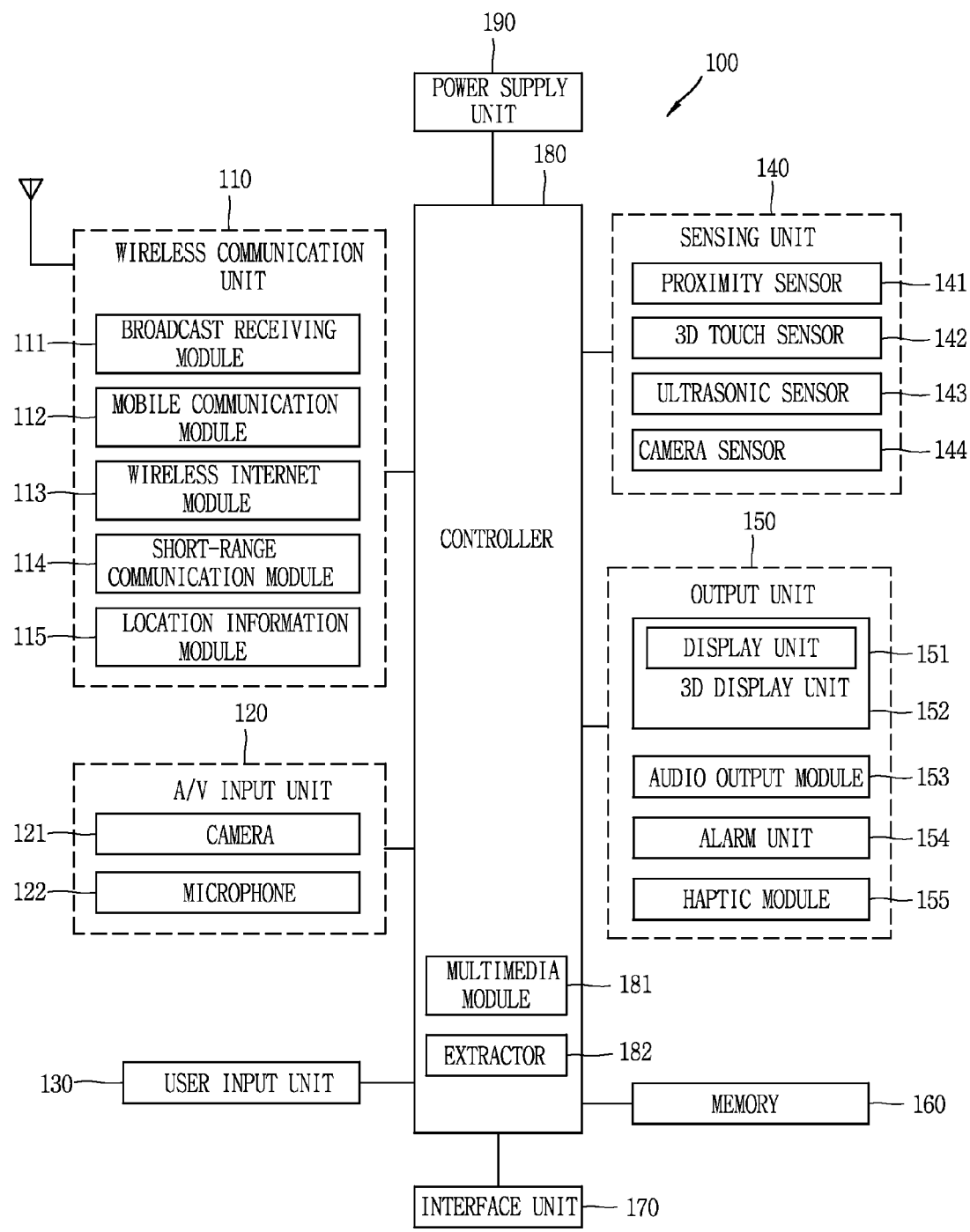

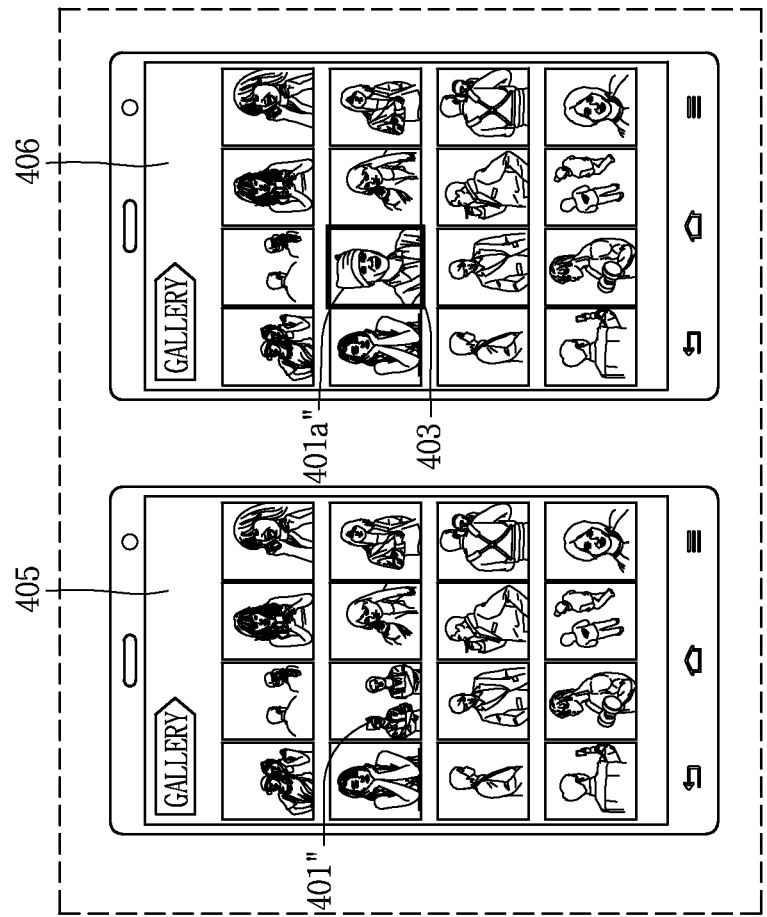
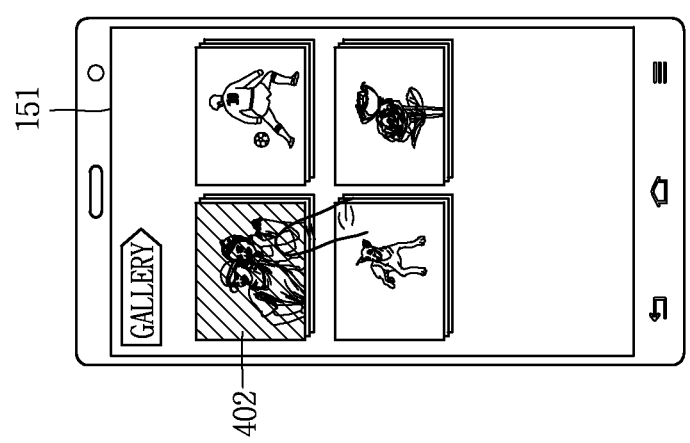

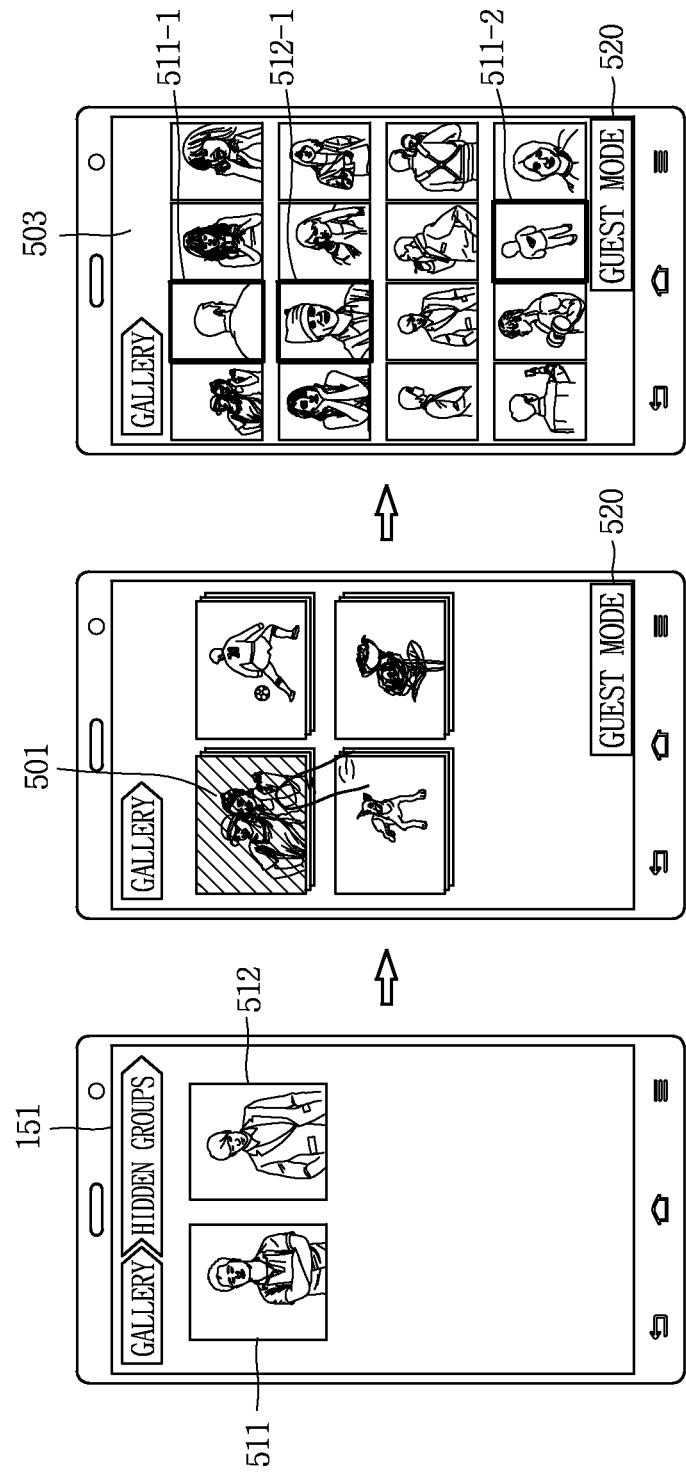

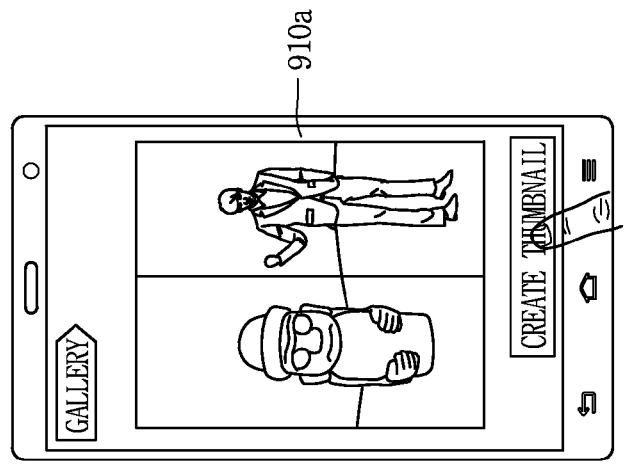
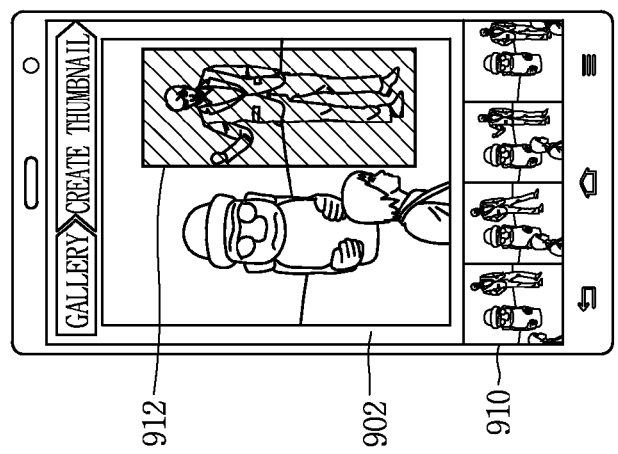
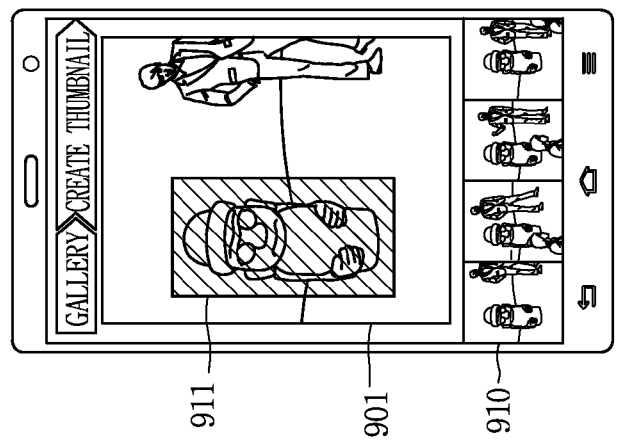

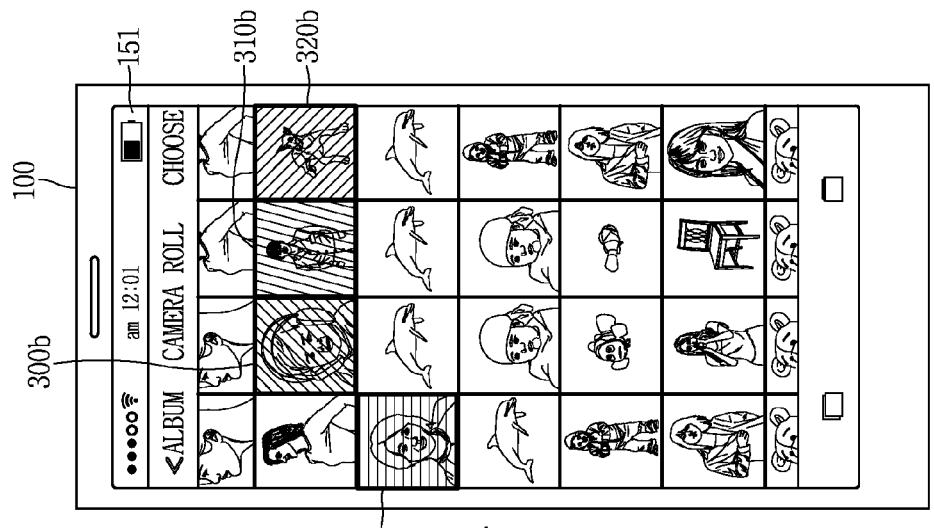
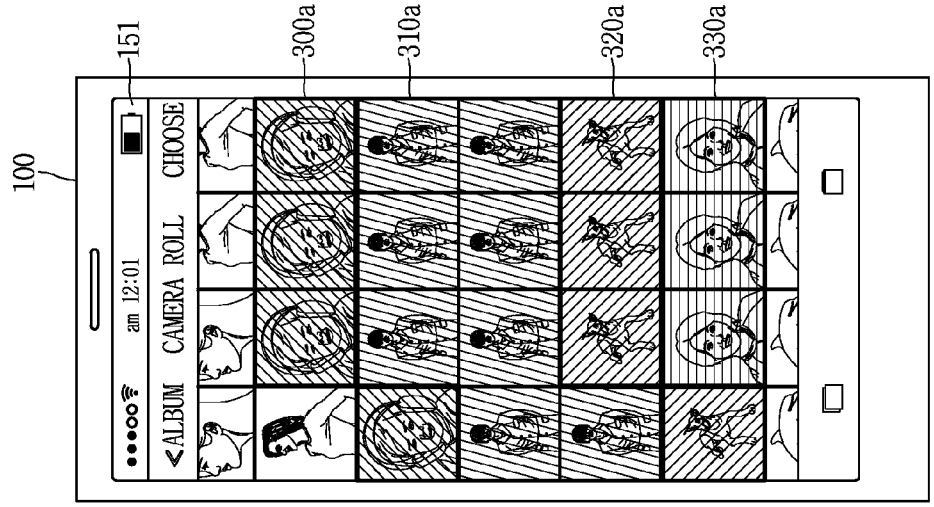
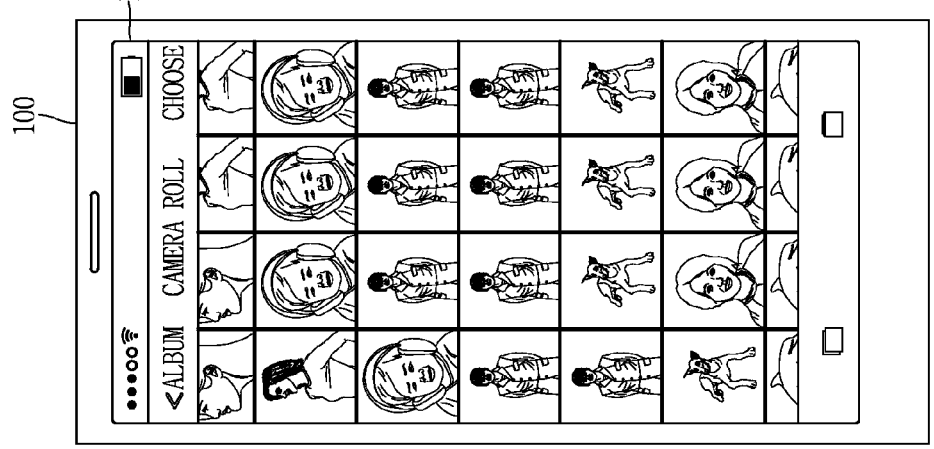
FIG. 10A(a)  FIG. 10A(b)  FIG. 10A(c)

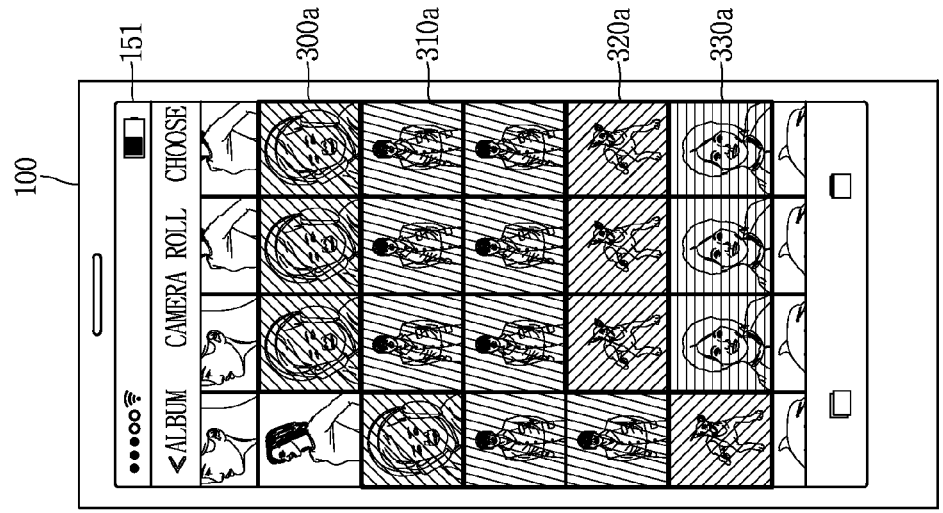
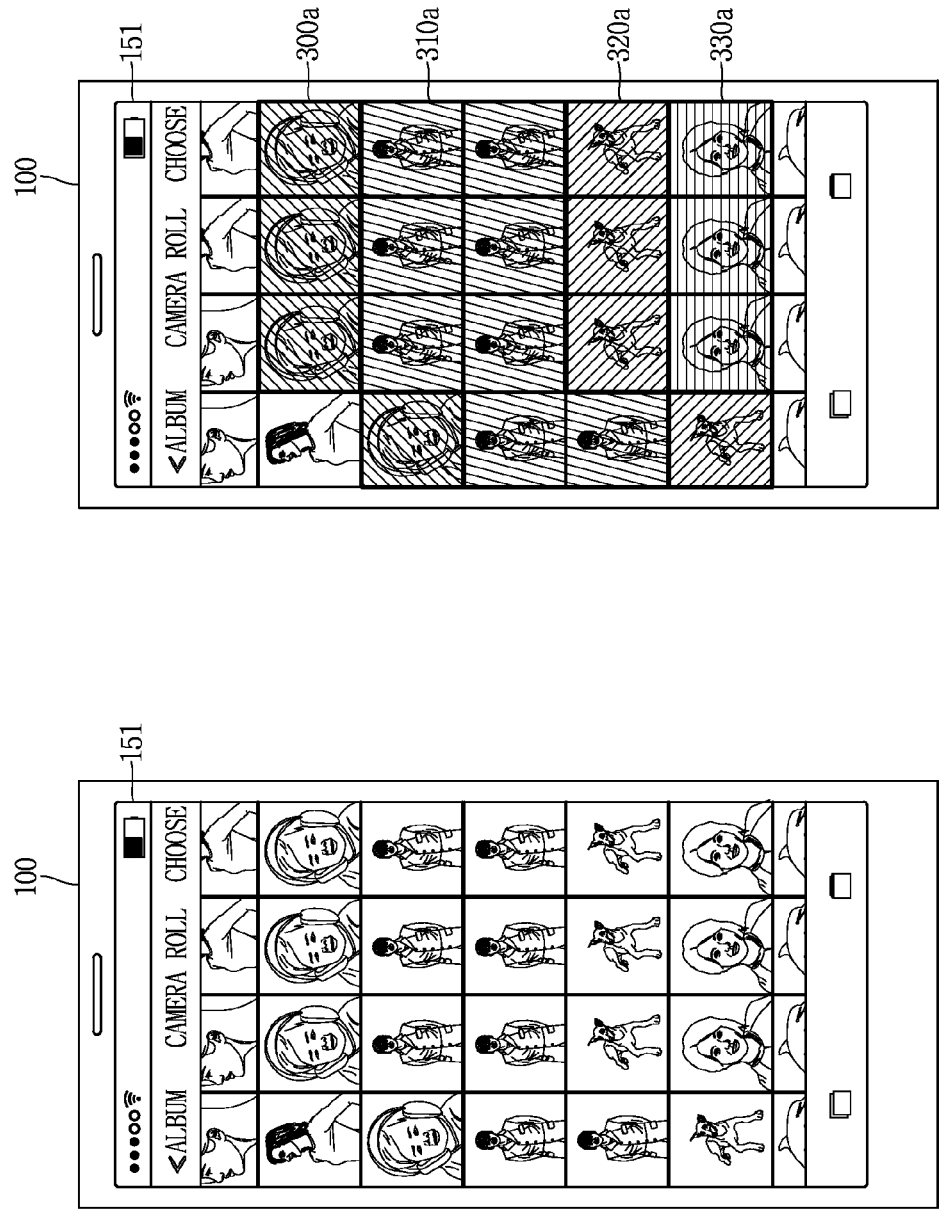

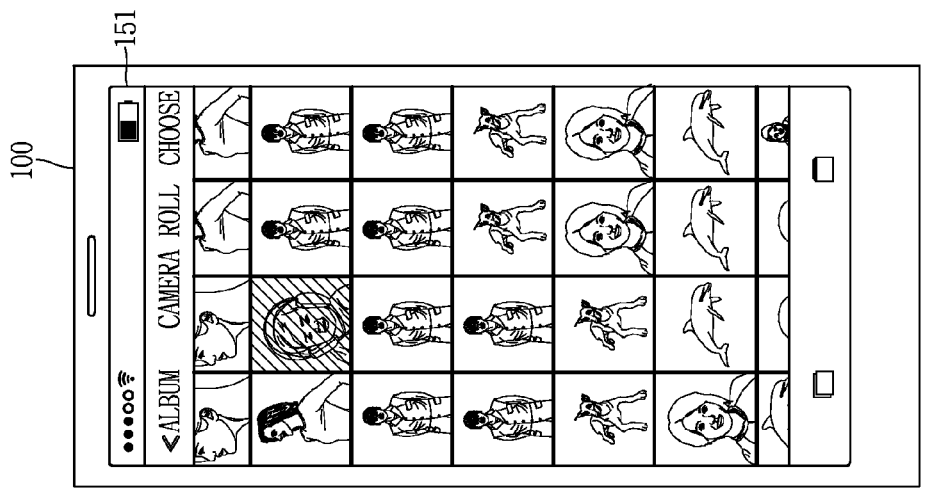
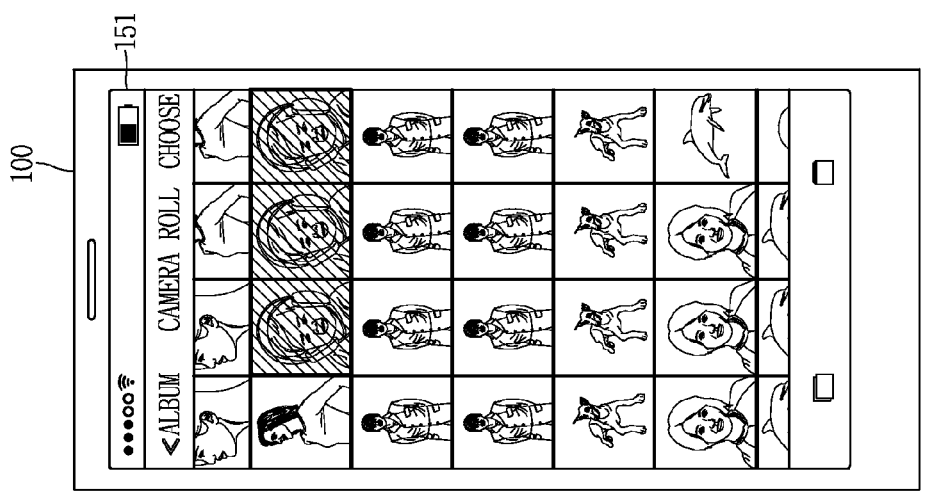
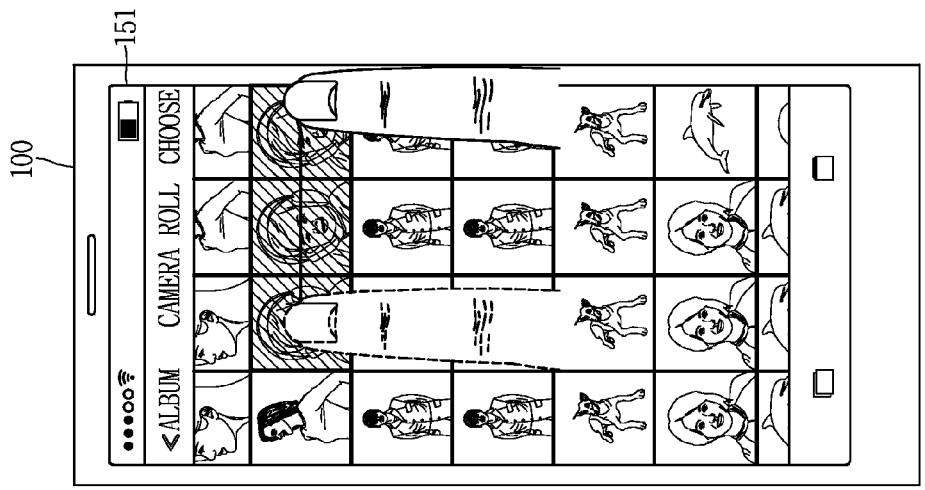

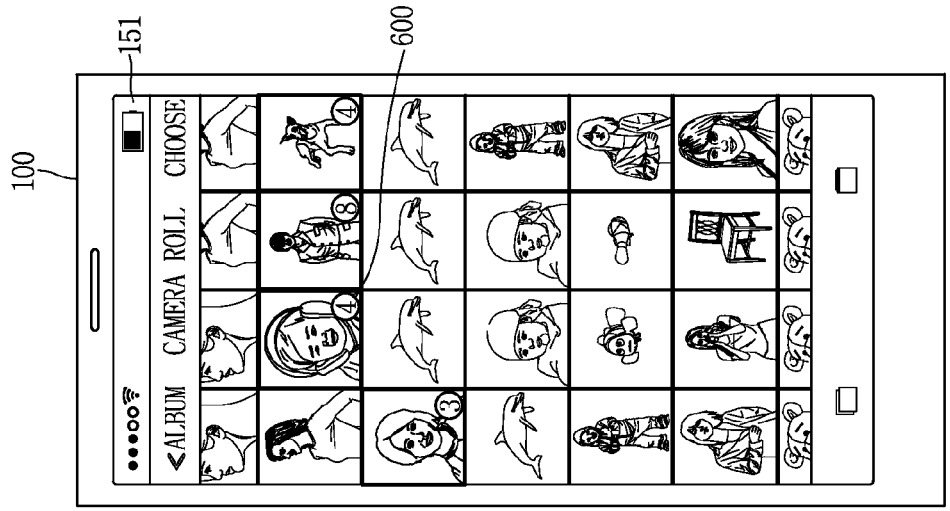
FIG. 13A
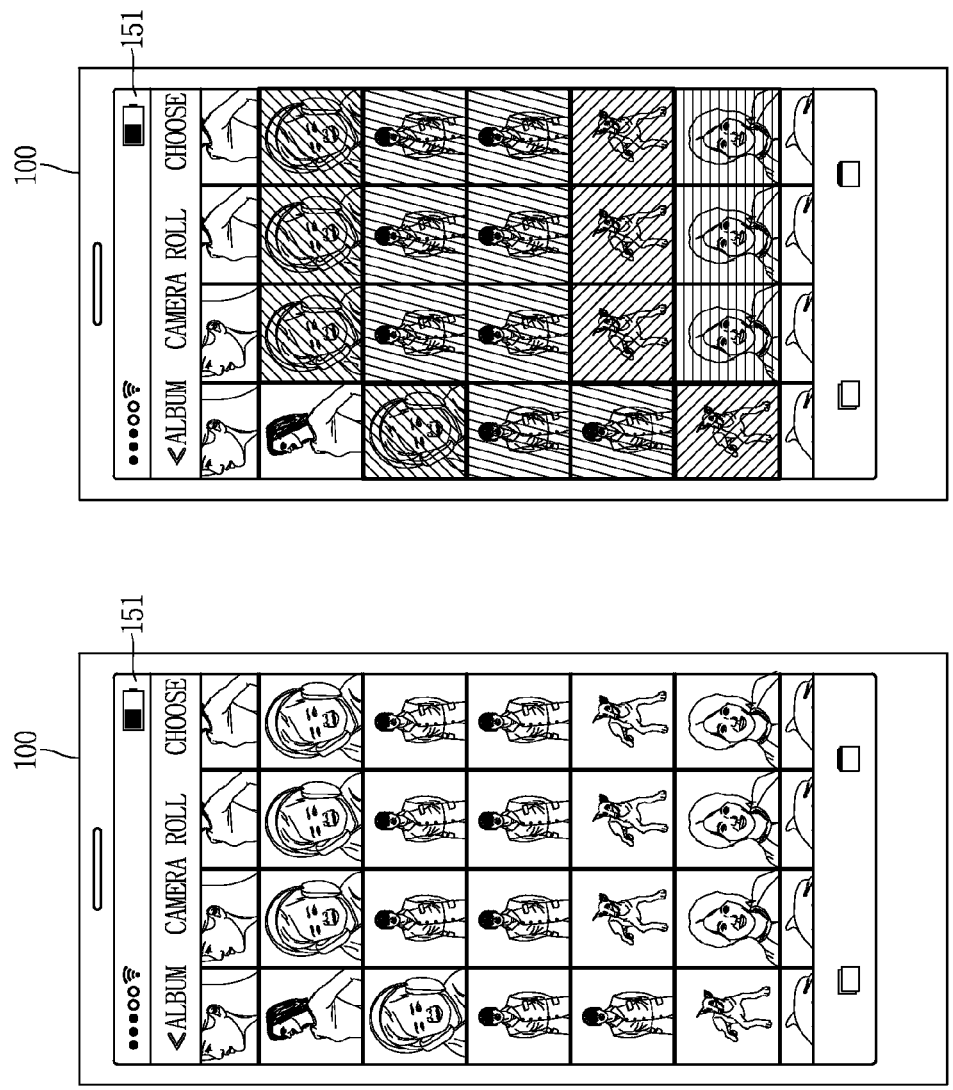
FIG. 13B
FIG. 13C

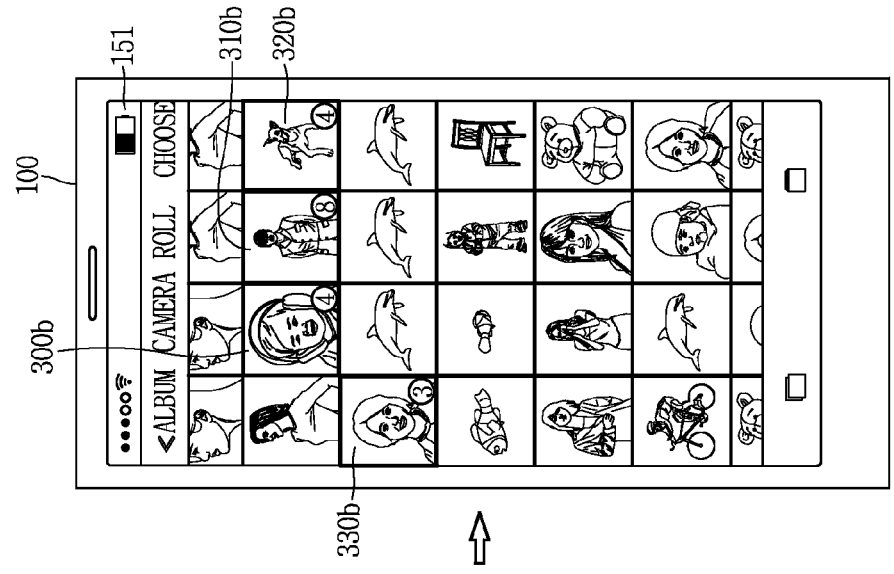
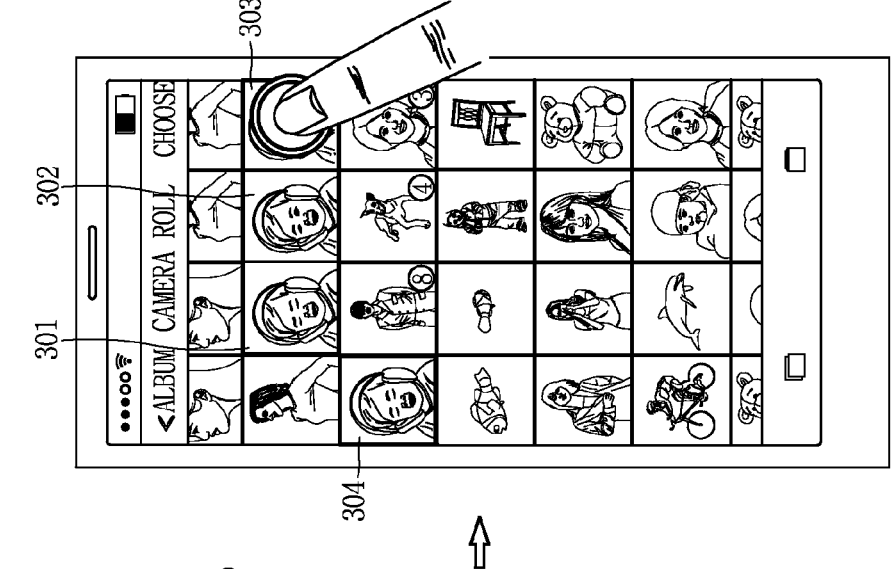
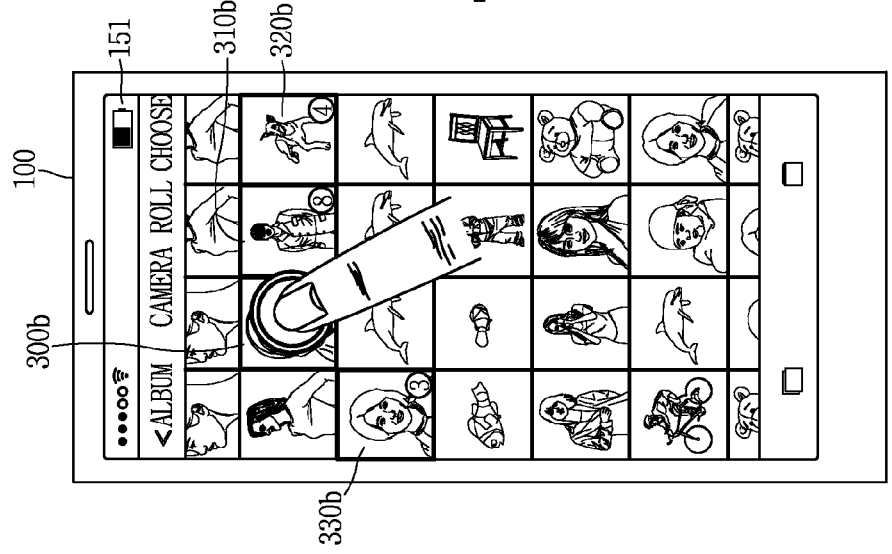

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2013-0158604, filed on Dec. 18, 2013, and Korean Application No. 10-2014-0007388, filed on Jan. 21, 2014 the contents of which is incorporated by reference herein in its entirety.

BACKGROUND OF THE INVENTION

1. Field of the Invention

The present invention relates to a mobile terminal capable of displaying a thumbnail of a specific image and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

As the functionality of cameras incorporated in mobile terminals has been improved and various kinds of media are provided to mobile terminals, users can save more images in a memory. Accordingly, saved images are reduced to a smaller size so that a large number of images are displayed at a time, in order to alleviate the inconvenience of having to perform a number of operations to find a specific one of the stored images that the user wants.

Since such reduced images are still the same as the original images, except that they are smaller in size than the original ones, images or figures the user does not want to show to others will be exposed. If the images are locked up, it makes it difficult to immediately tell which is which and the user has to unlock each time.

Moreover, saved images are usually arranged in order according to the time they are saved or captured. In this case, if there are too many saved images, the user's inconvenience of having to repeat the same operation a number of times until the user finds a specific image they want cannot be solved even if the images are reduced in size.

SUMMARY OF THE INVENTION

Therefore, an aspect of the present invention is to provide a mobile terminal which displays only some part of saved images a user wants when showing the saved images in thumbnails and allows the user to easily find thumbnails displaying only some part of the saved images, and a method for controlling the same.

Another aspect of the present invention is to provide a mobile terminal which recognizes the faces of figures in saved images and hides or displays specific faces when showing the thumbnails of the saved images and a method for controlling the same.

Yet another aspect of the present invention is to provide a mobile terminal which groups together similar ones among saved images and displays only one representative thumbnail.

To achieve these and other advantages and in accordance with the purpose of this specification, as embodied and broadly described herein, there is provided a mobile terminal including: a display configured to output a specific image in the image view mode; an extractor that extracts a specific area from the specific image, based on a touch gesture on the specific image; and a controller that creates a thumbnail of the specific image from an image of the extracted specific area, and when the image preview function is executed, outputs a thumbnail list that displays the created thumbnail of the specific image to be visually distinct from the thumbnails of other images.

In one embodiment, the controller recognizes a face in the specific image, and when the recognized face matches a saved face, outputs a graphics object for recommending the recognized face as the image of the specific area.

In one embodiment, upon sensing a touch gesture to hide some part of the specific image, the extractor extracts the some part of the specific image or the other part of the specific image as the image of the specific area.

In one embodiment, the controller recognizes a face in the some part, and creates a thumbnail of the specific image as an image that does not display the recognized face if the recognized face belongs to a first group or as an image that highlights the recognized face if the recognized face belongs to a second group.

In one embodiment, the mobile terminal may further include a user input unit that receives a control command for executing any one of first and second modes that offer different ways of displaying a thumbnail list corresponding to the image preview function, and the controller outputs a thumbnail list that hides a face belonging to the first group when the image preview function is executed in the first mode or a thumbnail list that exposes the face belonging to the second group when the image preview function is executed in the second mode.

In one embodiment, when the image preview function is executed, the controller allows information about the object contained in the extracted specific area to be displayed on the created thumbnail.

In one embodiment, if the object is a specific face, the controller displays the matching profile information saved in an address book on the created thumbnail In one embodiment, when the image preview function is executed, the controller outputs the created thumbnail of the specific image in a different form from the thumbnails of other images.

In one embodiment, when the image preview function is executed, the controller outputs a first thumbnail list with the created thumbnail of the specific image arranged at the center of the display, and after a given period of time, changes the first thumbnail list into a second thumbnail list with the created thumbnail of the specific image arranged at the original position.

In one embodiment, if the created thumbnail of the specific image is displayed in a predetermined area after scrolling the thumbnail list resulting from the execution of the image preview function based on a touch gesture, the controller stops the scrolling on the thumbnail list or decreases the scrolling speed.

In one embodiment, when the created thumbnail of the specific image is chosen from the thumbnail list, the controller enlarges the chosen thumbnail to a predetermined size and outputs the same, and changes the enlarged image into the original image corresponding to the chosen thumbnail after the lapse of a given period of time.

In one embodiment, when the created thumbnail of the specific image is chosen from the thumbnail list, the controller enlarges the chosen thumbnail to a predetermined size and outputs the same, and outputs a dog-ear mark in one area of the enlarged image.

In one embodiment, the controller changes the enlarged image into the original image corresponding to the chosen thumbnail, in response to a touch input in the direction indicated by the dog-ear mark.

In one embodiment, the controller recognizes a face contained in the enlarged image and outputs at least one thumbnail containing the recognized face in an area distinct from the area displaying the enlarged image.

In one embodiment, the controller groups multiple different images associated with the specific image into a group according to a defined criterion, and creates a representative thumbnail of the group from a specific area extracted from the specific image, based on a touch gesture on the specific image belonging to the group.

In one embodiment, when the image preview function is executed, the controller displays information indicating the number of images in the group on the representative thumbnail of the group.

In one embodiment, the controller groups at least some of the multiple images into a group in response to a predetermined type of touch applied on the at least some images, and when the image preview function is executed, outputs a thumbnail list in which the created representative thumbnail of the group is visually distinct from the thumbnails of other images.

In one embodiment, when the representative thumbnail of the group is chosen from the thumbnail list, the controller controls a plurality of thumbnails corresponding to the multiple images included in the group corresponding to the chosen representative thumbnail to be spread out in succession on the thumbnail list.

In one embodiment, when any one of the spread-out thumbnails is chosen, the controller gathers the spread-out thumbnails in the chosen thumbnail and changes the representative thumbnail of the group into the chosen thumbnail.

Furthermore, there is provided a method for controlling a mobile terminal according to an embodiment of the present invention, the method including the steps of: outputting a specific image in the image view mode; extracting a specific area from the specific image, based on a touch gesture on the specific image; creating a thumbnail of the specific image from an image of the extracted specific area; and when the image preview function is executed, outputting a thumbnail list that displays the created thumbnail of the specific image to be visually distinct from the thumbnails of other images.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram showing a mobile terminal according to an embodiment disclosed in this specification;

FIG. 5B(a) to 5B(c) are conceptual diagrams for explaining a method of outputting a thumbnail list so as not to expose the face of a specific face according to an embodiment of the present invention;

FIG. 13A to 13C are conceptual diagrams showing a method of outputting information related to multiple images included in a certain area according to an embodiment of the present invention;

FIG. 14A to 14C are conceptual diagrams showing a method of choosing a representative thumbnail for multiple images according to an embodiment of the present invention;

DETAILED DESCRIPTION OF THE INVENTION

Figure 2A:
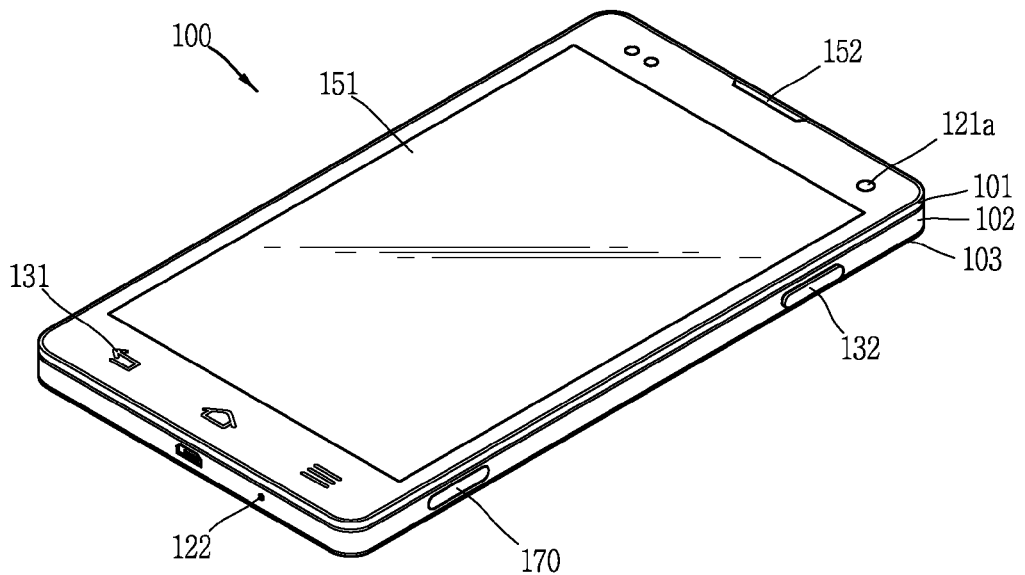
FIGS. 2A and 2B are front and rear perspective views of a mobile terminal according to the present invention.

Hereinafter, the present disclosure will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present invention may be also applicable to a fixed terminal such as a digital TV and a desktop computer, except for specific configurations for mobility.

FIG. 1 is a block diagram of a mobile terminal according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DM B-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The display unit 151 may be implemented in two or more in number according to a configured aspect of the mobile terminal 100. For instance, a plurality of displays may be arranged on one surface integrally or separately, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input to the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

FIG. 2A is a perspective view of the mobile terminal 100 according to an embodiment of the present invention.

The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102. A battery cover 103 for covering a battery 191 may be detachably mounted to the rear case 102.

Such cases may be formed by injection-molded synthetic resin, or may be formed using a metallic material such as stainless steel (STS) or titanium (Ti).

A display unit 151, a first audio output module 153a, a first camera 121a, a first user input unit 131, etc. may be disposed on a front surface of the body. A microphone 122, an interface unit 170, a second user input unit 132, etc. may be disposed on side surfaces of the body.

The display unit 151 may output information processed in the display device 100. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor is formed to be transparent such that visual information output from the display unit 151 can be viewed. The touch sensor may include a structure for enhancing visibility of a touch screen at a bright place. Referring to FIG. 2A, the display unit 151 occupies most parts of a front surface of the front case 101.

The first audio output module 153*a* and the first camera 121*a* may be arranged at a region adjacent to one end of the display unit 151, and the second user input unit 132 (refer to FIG. 3B), the interface unit 170, etc. may be arranged on the side surface of the body.

The first audio output module 153*a* may be implemented in the form of a receiver for transferring voice sounds to the user's ear or a loud speaker for outputting various alarm sounds or multimedia reproduction sounds.

It may be configured such that the sounds generated from the first audio output module 153*a* are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121*a* processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153*a*, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 2B:
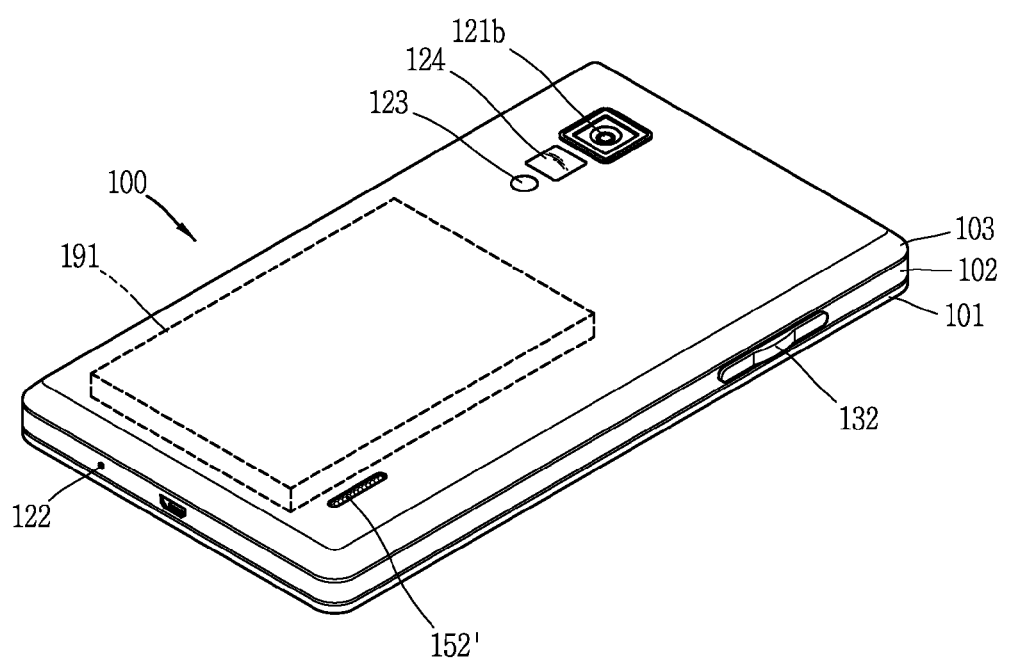

FIG. 2B is a rear perspective view illustrating mobile terminal 100 illustrated in FIG. 2A.

Referring to FIG. 2B, a second camera 121*b* may be additionally mounted at a rear surface of the terminal body, namely, the rear case 102. The second camera 121*b* has an image capturing direction, which is substantially opposite to the direction of the first camera unit 121*a* (refer to FIG. 3A), and may have a different number of pixels from that of the first camera unit 121*a*.

For example, it is preferable that the first camera 121*a* has a relatively small number of pixels enough not to cause difficulty when the user captures his or her own face and sends it to the other party during a video call or the like, and the second camera 121*b* has a relatively large number of pixels since the user often captures a general object that is not sent immediately. The first and the second camera 121*a*, 121*b* may be provided in the terminal body in a rotatable and popupable manner.

Furthermore, a flash 123 and a mirror 124 may be additionally disposed adjacent to the second camera 121*b*. The flash 123 illuminates light toward an object when capturing the object with the second camera 121*b*. The mirror 124 allows the user to look at his or her own face, or the like, in a reflected way when capturing himself or herself (in a self-portrait mode) by using the second camera 121*b*.

A second audio output unit 153*b* may be additionally disposed at a rear surface of the terminal body. The second audio output unit 153*b* together with the first audio output unit 153*a* (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

A mobile terminal 100 according to an embodiment of the present invention including at least one of the above-described components may save at least one image in a predetermined storage space in a memory 160. In this case, a galley application may be run according to user input to output saved images. When the gallery application is run, a display 151 may output the thumbnails of a plurality of saved images. Also, a controller 180 may enlarge chosen thumbnails to output them, or reduce chosen thumbnails to output more thumbnails, based on touch input on the display 151 where thumbnails are output.

Moreover, the mobile terminal 100 according to the embodiment of the present invention may extract a specific area the user wants to show, other than the area the user wants to hide, based on a touch gesture on a specific saved image. The controller 180 creates a thumbnail of the corresponding image from an image of the extracted specific area. That is, a thumbnail is created from only some part of the original image. In a thumbnail list resulting from the execution of the image preview function that is output on the display 151, the created thumbnail is displayed in a way that makes it visually distinct from the thumbnails of other images.

Figure 3:
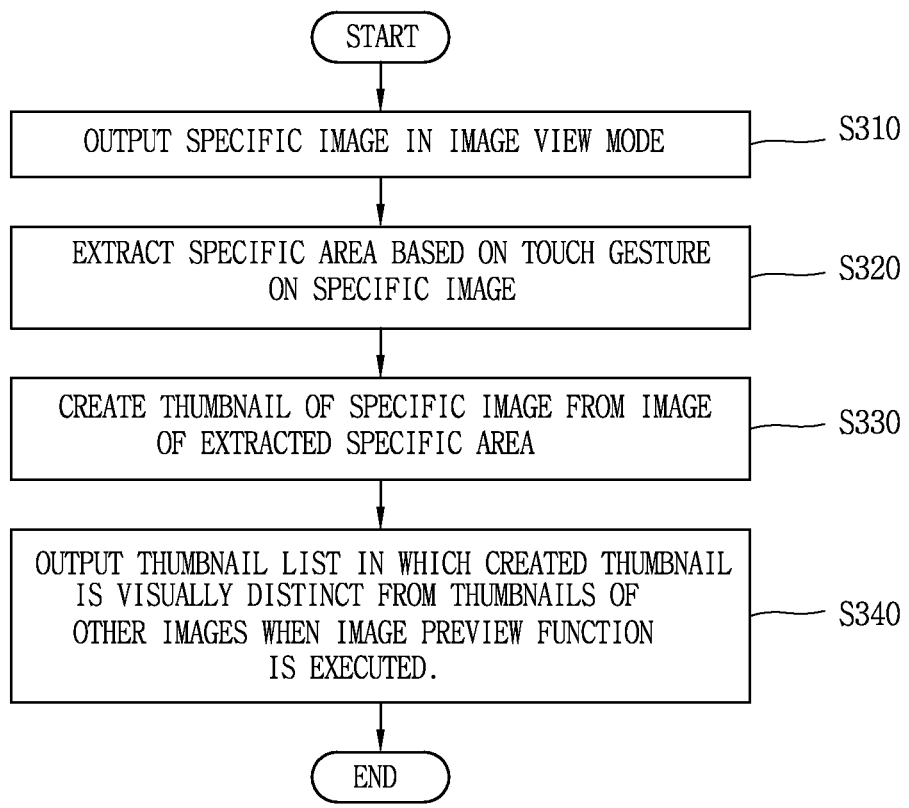
FIG. 3 is a flowchart for explaining a method for controlling a mobile terminal according to an embodiment of the present invention.
Figure 4A:
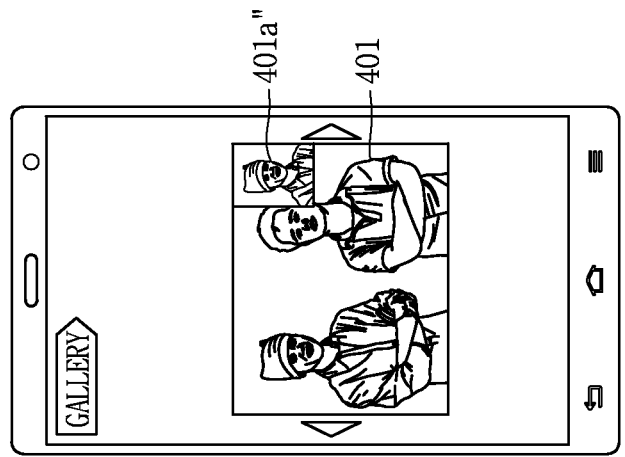
FIGS. 4A(a) to 4B(b) are conceptual diagrams for explaining the control method of FIG. 3.
Figure 4A:
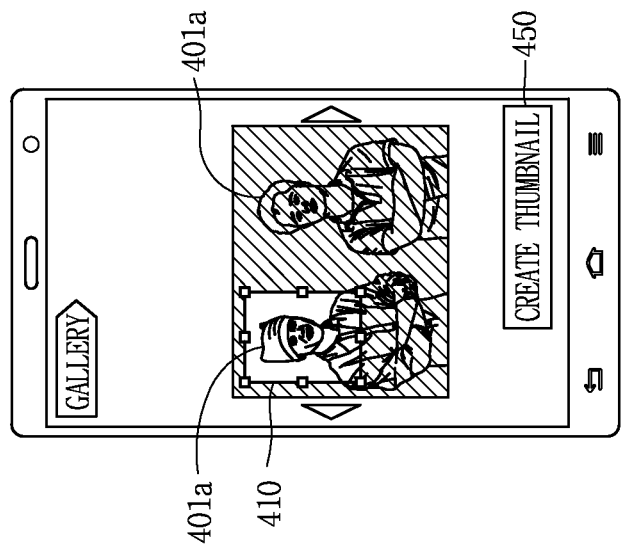
Figure 4A:
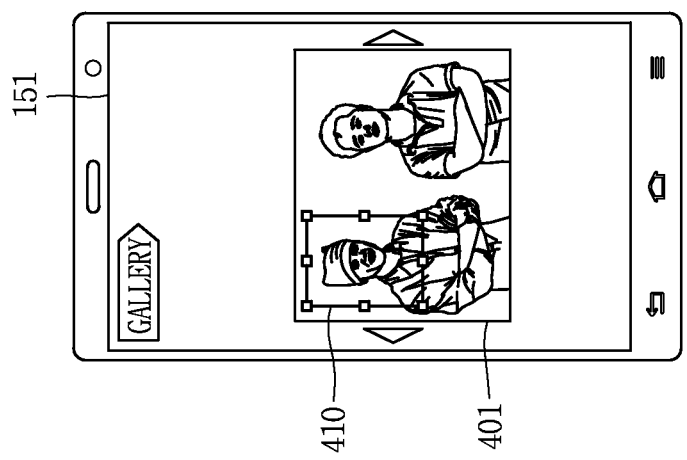

Referring to FIG. 3 and FIGS. 4A(a) to 4B(b), a method of displaying a specific area extracted from a specific saved image as a thumbnail for image preview according to an embodiment of the present invention will be described below in detail.

FIG. 3 is a flowchart for explaining a method for controlling a mobile terminal according to an embodiment of the present invention. FIGS. 4a and 4b are conceptual diagrams for explaining the control method of FIG. 3.

First of all, referring to FIG. 3, when the mobile terminal 100 according to the embodiment of the present invention enters the image view mode, it may output a specific image on the display 151 (S310).

The image view mode refers to the displaying of a specific saved image on the display 151 as the gallery application is run in response to user input or the review screen is touched after camera capture.

The types of specific saved image output on the display 151 are not limited. For example, the specific image may include an image saved (i.e., captured) of screen information output on the display 151, an image saved of only photos or graphics in web pages, information on a screenshot of a playable video file, a graphics file saved in advance by the service provider of the mobile terminal 100, wallpaper, an image downloaded from other external devices, and so on. Also, the specific saved image may be an image displayed on the review screen after camera capture.

Upon sensing a touch gesture on the displayed specific image while the specific image is being displayed, a specific area may be extracted from the specific image (S320).

To this end, first of all, the controller 180 may enter the thumbnail creation mode for the displayed specific image, in response to specific key input or a predetermined touch gesture. When the controller 180 enters the thumbnail creation mode, it may extract a specific area from the specific image to create a thumbnail.

The touch gesture for extracting a specific area refers to predetermined touch input for specifying a part of the displayed specific image that the user wants to expose as a thumbnail or hide from a thumbnail list.

For example, the touch gesture may be closed-curve shaped drag touch input on a part the user wants to extract from the displayed specific image.

Also, the touch gesture may be a gesture of covering with a hand a part of the displayed specific image the user does not want to expose. In this case, the mobile terminal 100 may sense an abrupt change in the illumination of the hidden part through a sensing unit 140. Then, the controller 180 may output on the display a graphics object (e.g., focusing box) that recommends the part where the abrupt change in illumination is sensed or the other part as the specific area.

Also, the touch gesture may be gesture input for manipulating a focusing box that pops up when one area of the displayed specific image is long touched.

There are no limits on the size and target of an area that can be extracted from a specific image. For example, the area to be extracted may be a specific object of the image, or the background excluding a chosen specific object. The extracted specific area may be saved in the memory 160 in chronologic order, and output in a list format if required or automatically registered in the phonebook according to the settings.

For example, referring to FIG. 4A(a), when the controller 180 enters the thumbnail creation mode while a specific photographic image 401 is output on the screen by running the gallery application, a focusing box 410 is displayed within the specific photographic image. The user may adjust the size of the focusing box 410 by pinching out two or more touches within the focusing box 410 to make them close to each other or pinching in them to make them distant from each other, and adjust the location of the focusing box 410 by dragging the touches within the focusing box 410 to a desired location, thereby choosing a part of the specific photographic image 401 that the user wants to expose as a thumbnail.

Next, the controller 180 creates a thumbnail of the specific image from an image of the extracted specific area (S330). The created thumbnail may be hereinafter referred to as 'partial thumbnail' for the purpose of illustration. Other images from which no specific images are extracted are entirely created as thumbnails.

Even if extracted specific areas are different in size, their partial thumbnails may come in the same size or the same predetermined shape. For example, even if a first partial thumbnail is extracted from an area ¼ the size of a first image and a second partial thumbnail is extracted from an area ⅒ the size of the first image, the first and second partial thumbnails are all come in the same size and shape.

For example, referring to FIG. 4A(b), when a partial image 401a the user wants to show, other than the area the user wants to hide, is chosen from the photographic image 401 by using the focusing box 410, the area outside the focusing box 410 is shaded to visually display that the partial image 401a is specified. Hereupon, when the user chooses a 'create thumbnail' key 450 displayed on the display 151, the partial image 401a is created as a thumbnail of the photographic image 401. Once the partial image 401a is created as a thumbnail, a thumbnail 401a" created on one side of the photographic image 401 is displayed as shown in FIG. 4A(c). At this point, when the user touches the displayed thumbnail 401a", the process returns to the step of extracting a specific area as shown in FIG. 4A(a), rather than enlarging the thumbnail 401a".

In another embodiment of the present invention, a plurality of specific areas may be extracted from a single image.

If a plurality of specific images are extracted, the controller 180 may create thumbnails of the specific image from a plurality of areas the user wants to expose. That is, a plurality of thumbnails can be created from a single image. Alternatively, if a plurality of specific images are extracted, the controller 180 may combine a plurality of areas the user wants to expose together to create a single thumbnail.

Subsequently, when the image preview function is executed, the controller 180 outputs a thumbnail list in which the created thumbnail is visually distinct from the thumbnails of other images (S340). Accordingly, the user can immediately tell whether each thumbnail is a reduced-size version of the original image or only a part the user wants to expose, while viewing the thumbnail list.

The image preview function refers to a function of displaying saved images in reduced thumbnails to show more images on a single screen. The image preview function can be executed by running the gallery application, for example, and choosing a specific file or a specific key (soft key or hard key).

The visually distinctive display refers to displaying the thumbnails of images other than a created partial thumbnail in a different color, frame, background color, luminance, resolution, transparency, size, etc. Alternatively, the visually distinctive display may refer to highlighting only the created partial thumbnail (for example, making it flicker) or displaying specific information only in the created partial thumbnail.

For example, referring to FIG. 4B(a), when a specific folder 402 is chosen by running the gallery application, the photo preview function is executed. Then, a thumbnail list 405 containing only reduced-size thumbnails of the original photographic images are output as shown in FIG. 4B(b) in the conventional art. In the embodiment of the present invention, on the other hand, the steps of FIG. 4A(a) to 4A(c) are performed to display the frame 403 of the created partial thumbnail 401a″ in a different shape from the frames of other thumbnails, as shown in FIG. 4B(b). For example, the frame of the partial thumbnail 401a″ is displayed highlighted in a different color with large thickness so as to be made visually distinct. Accordingly, the user can immediately recognize the position of the partial thumbnail 401a″.

Although not shown, if a plurality of areas are extracted from a single image and created as a plurality of thumbnails, as explained above, the image preview function may be executed to display the plurality of thumbnails in an alternating manner at the thumbnail positions for the corresponding photos as shown in FIG. 4B(b).

In one embodiment of the present invention, when a thumbnail list is output by executing the image preview function, scrolling is performed in response to flick input in one direction on the thumbnail list output to find a specific image. If there are many saved images, the number of the thumbnails for the saved images is large and the user has to do touch input for scrolling many times.

As such, in one embodiment of the present invention, when the created partial thumbnail enters a predetermined area of the display 151 during the scrolling, the controller 180 may stop the scrolling of the thumbnail list or decrease the scrolling speed by a predetermined amount or gradually. That is, the position of the created partial thumbnail may act as a breakpoint of scrolling.

In this way, according to embodiments of the present invention, when showing images saved in the terminal in thumbnails, only specific parts of the saved images the user wants to show may be displayed, thus offering the convenience of allowing the user to immediately identify the saved images without exposing images or figures the user does not want to show to others. Also, a created partial thumbnail is visually distinct from other thumbnails and acts as a breakpoint during scrolling, so the user can find a specific image more easily and quickly by using the partial thumbnail.

Figure 5A:
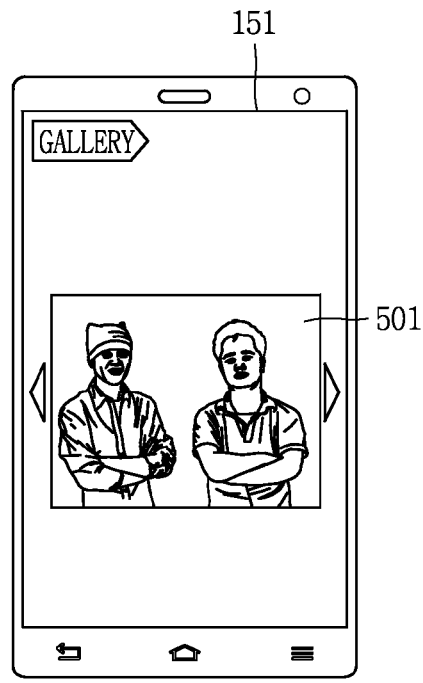
FIG. 5A(a) to 5A(d) are conceptual views for explaining a method of creating a thumbnail from an extracted specific area based on a touch gesture according to an embodiment of the present invention.
Figure 5A:
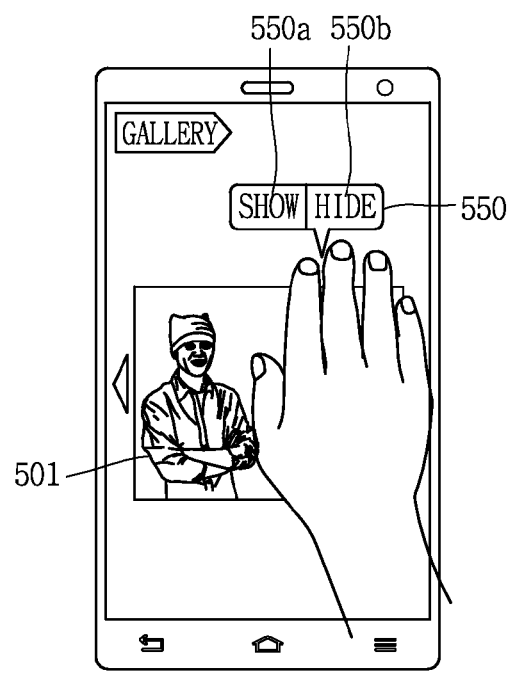
Figure 5A:
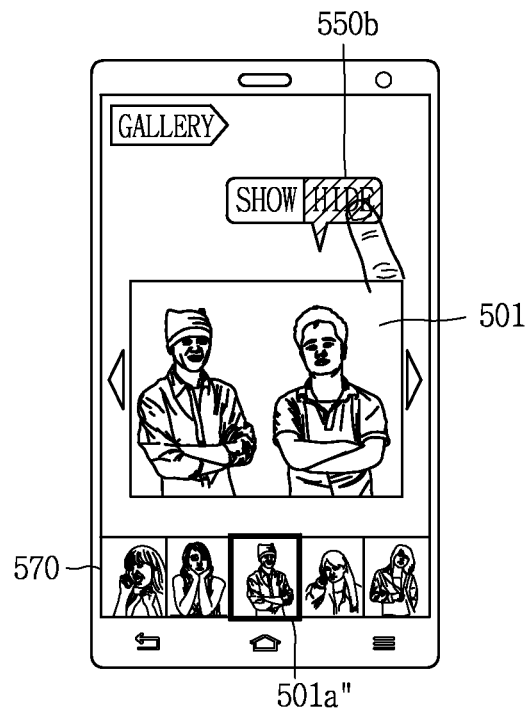
Figure 5A:
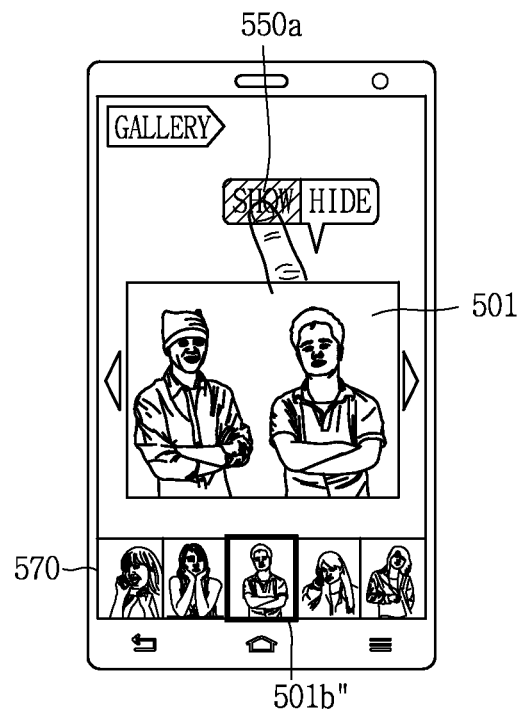

FIG. 5A(a) to 5A(d) explain a concrete embodiment of a method for creating a thumbnail from a specific area based on a touch gesture on a photographic image according to an embodiment of the present invention.

In the embodiments to be described hereinafter, it is presumed that the face recognition function is executed on the mobile terminal 100. When the face recognition function is executed, the controller 180 may detect information on the overall contour or skin tone of face and information on the features (e.g., length, location, angle, and shape) of the facial elements such as the eyes, nose, mouth, eyebrows, or ears from an image, in order to recognize a specific face.

When a specific image is output in the photo view mode, the controller 180 may recognize a face in the specific image. Then, the controller 180 compares the recognized face with face images saved in the phonebook, address book, etc of the terminal. If there is a match, the controller 180 outputs on the recognized facial area a graphics object (e.g., focusing box) that recommends the recognized facial area as a specific area.

For example, as shown in FIG. 4(a), the focusing box 410 may be initially output at a point corresponding to the user's touch gesture, or the focusing box 410 may be output on the corresponding facial area to recommend this area as a specific area for thumbnail creation when the face in the photographic image matches a face image saved in the terminal.

Upon sensing a touch gesture to hide a specific face in a specific photographic image, the controller 180 may extract the hidden specific face as the specific area for thumbnail creation, or extract the area except for the hidden specific face as the specific area for thumbnail creation.

To this end, an extractor 182 may extract a specific area by manipulating a menu output by a touch gesture to hide some part of a specific image with a hand. The output menu may be a pop-up window for inquiring about processing the hidden part.

For example, referring to FIG. 5A(a), upon sensing a touch gesture to hide a specific figure from a specific photographic image 501 output, the controller 180 recognizes a specific face in an area where an abrupt change in illumination has occurred, according to illumination information transmitted from the sensing unit 140. Then, as shown in FIG. 5A(b), a pop-up window 550 that asks about processing the hidden specific figure is output. When the user chooses 'view' key 550a in the pop-up window 500, a thumbnail list 570 is output in the bottom part of the photographic image 501, as shown in FIG. 5A(d). The thumbnail of the photographic image 501 shows 501b″ only the hidden specific figure. On the other hand, when the user chooses 'hide' key 550b in the pop-up window 500, a thumbnail list 570 is output in the bottom part of the photographic image 501, as shown in FIG. 5A(c). The thumbnail of the photographic image 501 shows 501a″ the image except for the hidden specific figure.

Although not shown, upon sensing a touch gesture to hide a specific area or a specific figure from a specific photographic image, the controller 180 may output the photographic image in a way that the hidden part is folded, as well as displaying a thumbnail. In this case, the controller 180 may correct any dislocation of the image caused by folding to make the image look natural, or may fold the image only in one selected direction.

Upon sensing a gesture to hide some part of a specific image with a hand, the controller 180 may recognize a face in the hidden part.

The recognized face may be exposed or hidden only from the corresponding photographic image. Alternatively, the recognized face may be exposed or hidden from all saved images, all the images saved in a specific folder, or all images conforming to preset criteria (images captured for a given period of time, images capture at the same place, etc).

Specifically, the controller 180 may create a folder (hereinafter, 'first folder') that is designated not to show the recognized face in a thumbnail and a folder (hereinafter, 'second folder') that is designated to expose the recognized face in a thumbnail or highlight it. According to the user's selection, the recognized face may be extracted as a specific area only from the corresponding image, or may be designated to belong to the first group or the second group.

If the recognized face belongs to the first group, the controller 180 changes the thumbnails of images containing this face into thumbnails that do not display the recognized face.

Also, if the recognized face belongs to the second group, the controller 180 changes the thumbnails of images containing this face into thumbnails that highlight the recognized face (or expose the recognize face as it is).

When a face belonging to the first group and/or the second group is deleted, changed, or added, the controller 180 may update the thumbnails containing this face at a time or return to the previous thumbnails.

FIG. 5B(a) to 5B(c) are conceptual diagrams for explaining a method of outputting a thumbnail list so as not to expose the face of a specific face (or so as to highlight the face of a specific face) according to an embodiment of the present invention.

As explained above, one objective of creating a thumbnail from only a desired part of a specific image is to exclude a part of the specific image the user does not want to expose to a third person. As such, the mobile terminal 100 according to the embodiment of the present invention may display a thumbnail list in different ways depending on whether the user or the third person is viewing the thumbnail list.

To this end, a user input unit 130 of the terminal may receive a control command to execute either a first mode (hereinafter, 'user mode') in which a thumbnail list corresponding to the image preview function displays the original images or a second mode (hereinafter, 'guest mode') in which at least part of saved images displays only part of the original images.

In the guest mode, when the image preview function is executed, the controller 180 outputs a thumbnail list that hides a face belonging to the first group (i.e., a folder designated not to show a recognized face in a thumbnail). Accordingly, the face designated to belong to the first group is not displayed on the display 151.

In the user mode, when the image preview function is executed, the controller 180 outputs a thumbnail list that exposes a face belonging to the first group (i.e., a folder designated not to show a recognized face in a thumbnail) as it is. However, partial thumbnails created individually by the user are output as it is.

For example, when 'hidden group' 510 is chosen in the subcategories of the gallery as shown in FIG. 5B(a), the thumbnails 511 and 522 of specific figures the user does not want to expose are output to the corresponding folder. When the user runs the gallery application to choose a specific photo folder and the 'guest mode' 520 is executed as a display mode corresponding to the image preview function for the chosen photo folder, thumbnails 511-1, 511-2, and 512-1 hiding the faces 511 and 512, instead of the thumbnails of images containing the faces 511 and 512 belonging to the hidden group, is output in a thumbnail list as shown in FIG. 5B(c). Although not shown, when the 'guest mode' 520 icon is touched, the controller 180 immediately switches to the 'user mode' or enables an encryption key input window for switching modes to pop up.

Regarding the step S340 explained with reference to FIG. 3, various embodiments for displaying a created thumbnail differently from the thumbnails of other images will be described below.

Figure 6A:
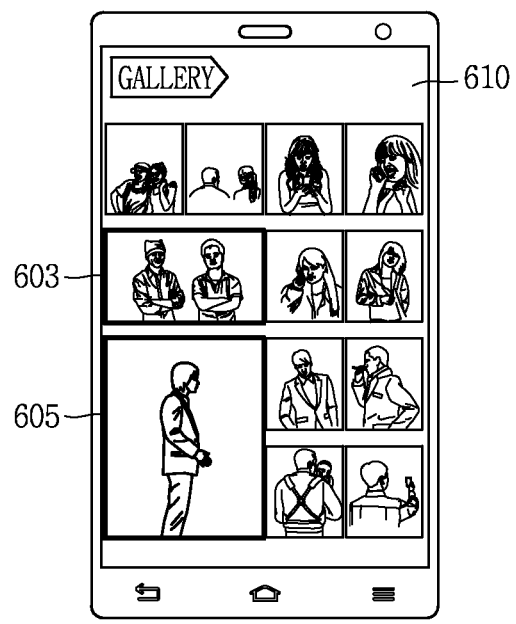
FIGS. 6A to 6C(b) are conceptual views for explaining a method of displaying a created thumbnail differently from the thumbnails of other images according to an embodiment of the present invention.
Figure 6B:
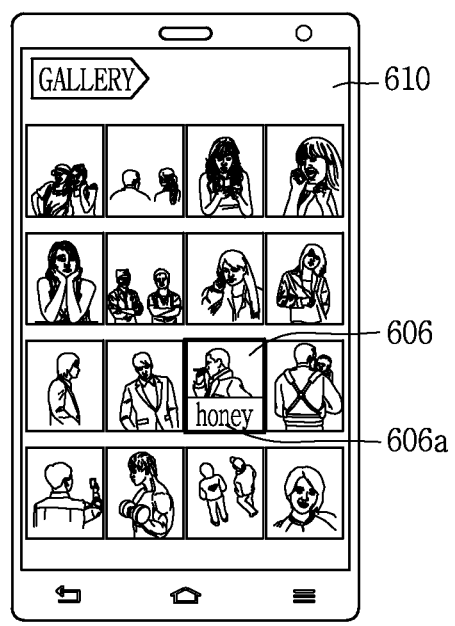
Figure 6C:
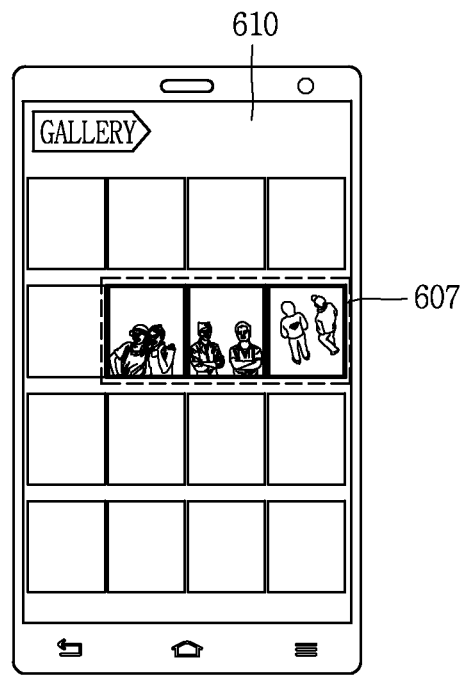
Figure 6C:
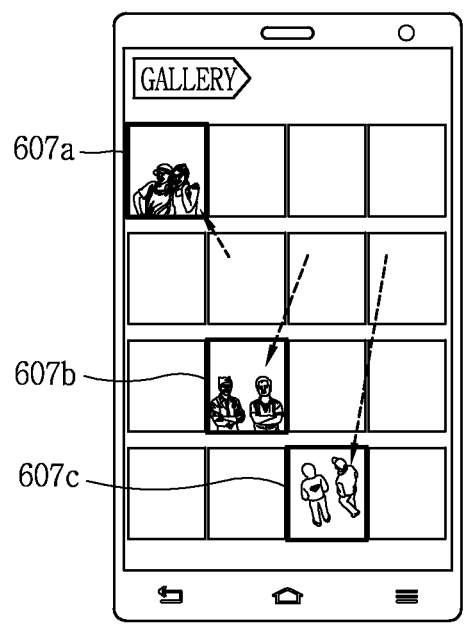

FIGS. 6A to 6C(b) are conceptual views for explaining a method of displaying a created thumbnail differently from the thumbnails of other images according to an embodiment of the present invention.

When the image preview function is executed when there is at least one partial thumbnail created, the controller 180 may output the created thumbnail in a different form from the thumbnails of other images.

For example, as shown in FIG. 6A, in a thumbnail list 610 resulting from the execution of the image preview function, the created thumbnail may be output as a thumbnail 603 of 2×1 size or a thumbnail 605 of 1×2 size. The width and length of the created thumbnail may be automatically determined in proportion to the surface area of the extracted specific area or by the user settings. Although not shown, the frames of created thumbnails may be displayed in a different color or with a different thickness from the frames of other thumbnails, and the frames of created thumbnails may be displayed in a different color from each other.

Also, when the image preview function is executed when there is at least one partial thumbnail created, the controller 180 may allow information about the object contained in the extracted specific area to be displayed on the created thumbnail so that the created thumbnail is distinct from other thumbnails.

If the object contained in the specific area is a specific face, the controller 180 searches for saved photo information in the address book that matches the specific face, and display the matching profile information in the address book on the created thumbnail.

For example, referring to FIG. 6B, the profile name, e.g., 'my darling' 606a saved in the address book that matches the face in the created thumbnail 606, along with the thumbnail whose frame is distinct from those of other thumbnails, may be displayed over the thumbnail 606.

Also, when the image preview function is executed when there is at least one partial thumbnail created, the controller 180 may output a first thumbnail list with the created thumbnail arranged at the center of the display.

That is, a thumbnail list is usually displayed in chronologic order, like photo images corresponding to thumbnails. In this figure, however, the user is assumed to be much interested in the created partial thumbnail, and this thumbnail is arranged to be exposed to a position that gives the user a better view of it.

For example, as shown in FIGS. 6C(a) and 6C(b), created partial thumbnails 607 may be arranged in a group at the center of the screen. After a given period of time, the controller 180 may move the created partial thumbnails 607 to their original positions 607a, 607b, and 607c in the first thumbnail list 607 where thumbnails are arranged in groups, and changes the first thumbnail list 607 into a second thumbnail list 611 with thumbnails arranged in the order in which the original images are saved. In this case, the user, upon seeing an animation effect that moves the created partial thumbnails 607 to their original positions, can easily find out where the images corresponding to the specific partial thumbnails 607a, 607b, and 607c are originally saved.

Although not shown, the thumbnail of an image in which the user is assumed to be much interested, as well as the created partial thumbnails, may be displayed in a way that stands out in the thumbnail list.

To this end, the controller 180 may create history information about the number of views of a specific image, especially, how many times the specific image is zoomed in, the number of hits on the specific image, the amount of time and number of times the user fixes their eyes on the specific image, the number of similar, continuously shot photos, and so on.

Based on the created history information, the controller 180 assigns a weighted value to the specific image, assumes that the user is much interested in the specific image if the weight value is greater than a reference value, and allows the thumbnail corresponding to this image to be displayed in an area, e.g., the center or initial position, in the thumbnail list where the user has a better view. Alternatively, the controller 180 may allow the thumbnail of an image with a weight value greater than the reference value assigned to it to be greater in size than the rest of the thumbnail list to make it stand out from other thumbnails.

At this point, when the image preview mode is executed, the display 151 may display a thumbnail in which the user is assumed to be much interested and a partial thumbnail created by the user in a way that make them visually distinct from each other, based on the created history information.

Moreover, the display 151 may display the thumbnail in which the user is most interested in the most distinctive area (e.g., the center) in the thumbnail list and the thumbnail in which the user is assumed to be second most interested in the second most distinctive area (e.g., an area around the center), based on the weight value received from the controller 180.

In addition, upon sensing a predetermined input signal (e.g., specific key input) while the first thumbnail list with thumbnails in which the user is interested arranged in distinctive areas is shown, the controller 180 may output the second thumbnail list with thumbnails arranged in the original positions where the corresponding images are saved.

If there are too many saved images, the corresponding thumbnail list becomes quite long, and therefore the user has to touch a lot of times to find a desired image by scrolling.

Figure 7C:
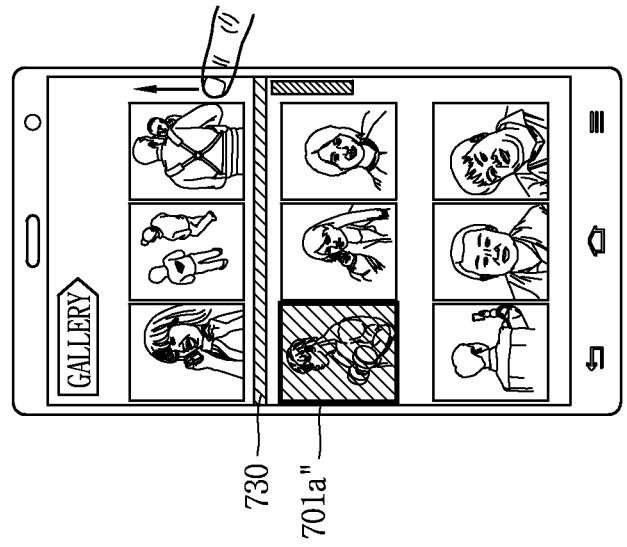
FIG. 7A to 7C are conceptual diagrams for explaining a method of using a created thumbnail as a breakpoint of scrolling according to an embodiment of the present invention.
Figure 7B:
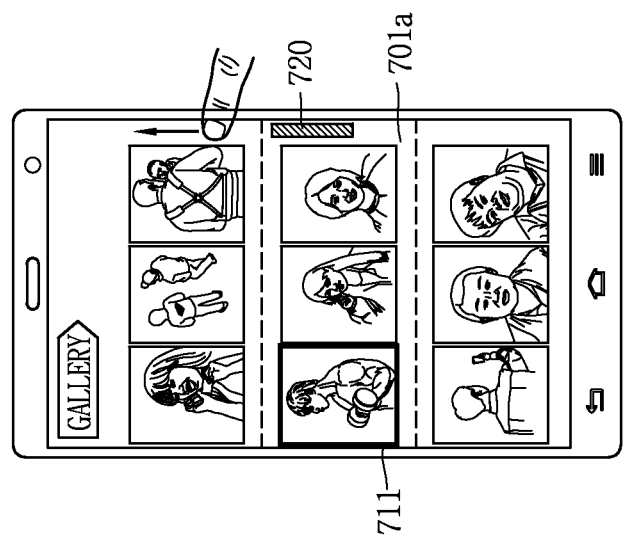
Figure 7A:
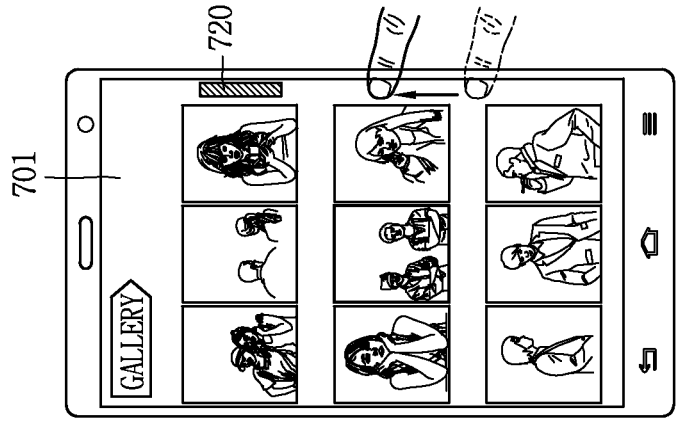

FIG. 7A to 7C are conceptual diagrams for explaining a method of using a created thumbnail as a breakpoint of scrolling according to an embodiment of the present invention.

As used herein, the term 'scrolling' refers to adding a new line at the top or bottom of the screen and moving all the data up or down a line if the screen output on the display 151 is full of data to display. For example, if scrolled down by flicking, a new line appears at the bottom of the screen, all the data is moved up a line, and the line at the top disappears. Vertical scrolling refers to scrolling up or down, and horizontal scrolling refers to moving data sideways either left or right.

When the image preview function is executed when there is at least one partial thumbnail created, the controller 180 may output a thumbnail list resulting from the execution of the image preview function. When the user flicks the output thumbnail list in one direction (vertical or horizontal direction), the thumbnails are scrolled in the direction corresponding to the flick input.

Upon sensing that the created thumbnail has entered a predetermined area after scrolling the thumbnail list resulting from the execution of the image preview function, the controller 180 may stop the scrolling on the thumbnail list or decrease the scrolling speed.

For example, referring to FIG. 7A, as a thumbnail list 701 output on the display 151 is vertically flicked, a vertically moving scrollbar 720 is output on one side of the screen, and the thumbnail list 701 is scrolled proportionally to the flick input. At this point, when a specific partial thumbnail 711 is output on the screen and enters a predetermined area of the screen, for example, a central screen area 701a (referring to FIG. 7B, scrolling is immediately stopped even if there is flick input, and a bar 730 indicating that scrolling is stopped is displayed on the partial thumbnail 711 and the partial thumbnail 711 is highlighted (e.g., flickers), as shown in FIG. 7C. Meanwhile, upon sensing flick input after scrolling is stopped, scrolling is resumed and the bar 730 indicating that scrolling is stopped disappears.

In this way, in the embodiment of the present invention, a thumbnail corresponding to a desired image can be easily found, even if there are too many saved images, by using a created partial thumbnail as a breakpoint of scrolling.

A method of outputting on the screen an image corresponding to a partial thumbnail chosen from a thumbnail list containing a created partial thumbnail will be described below by taking a concrete example.

Figure 8A:
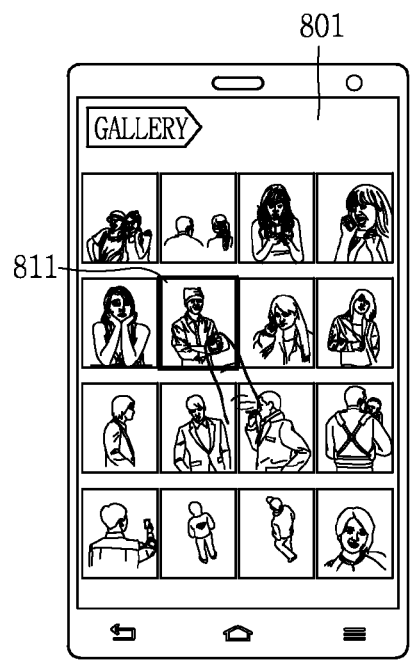
FIGS. 8A(a) to 8C(c) are conceptual diagrams for explaining a method of outputting the original image corresponding to a thumbnail chosen from a thumbnail list containing a created thumbnail according to an embodiment of the present invention.
Figure 8A:
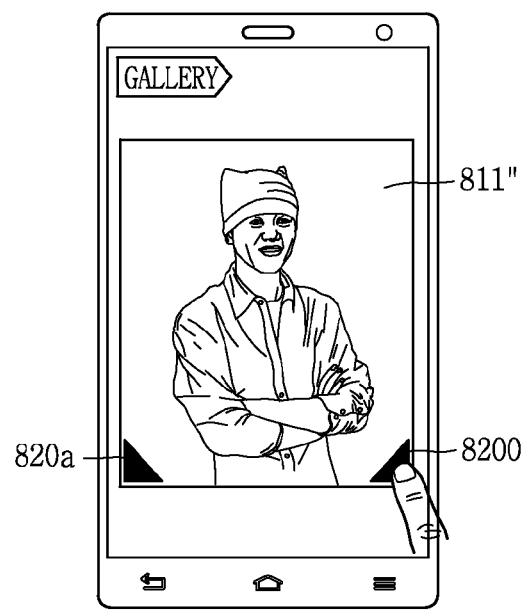
Figure 8A:
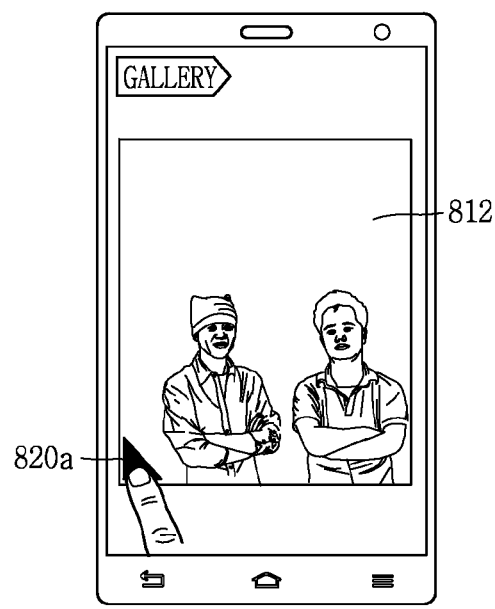
Figure 8A:
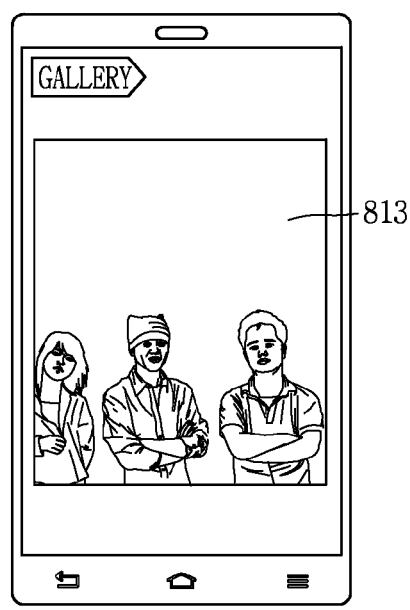

FIGS. 8A(a) to 8C(c) are conceptual diagrams for explaining a method of outputting the original image corresponding to a thumbnail chosen from a thumbnail list containing a created thumbnail according to an embodiment of the present invention.

Specifically, when at least one partial thumbnail is created and the created partial thumbnail is chosen from a thumbnail list resulting from the execution of the image preview function, the controller 180 enlarges the chosen thumbnail to a predetermined size and outputs it.

As the partial thumbnail is created from only a part of the original image, the user who has chosen the partial thumbnail will usually want to see even the unexposed part that is not included in the partial thumbnail.

In a first embodiment, after the lapse of a given period of time after the chosen thumbnail is enlarged to a predetermined size, the controller 180 may change the enlarged image into the original image corresponding to the chosen thumbnail. That is, the thumbnail can be restored to the original image using a predetermined animation effect (e.g., rotational effect) even if the user does not proceed to the next operation.

In a second embodiment, when the chosen frame is enlarged to a predetermined size, the controller 180 may further output a dog-ear mark in one area of the enlarged image. The position of the dog-ear mark may be associated with the position of a specific area extracted in the step of creating a partial thumbnail. Subsequently, in response to touch input in the direction indicated by the dog-ear mark, the controller 180 may change the enlarged image into the original image corresponding to the chosen thumbnail.

For example, referring to FIG. 8A(a), when a specific partial thumbnail 811 is chosen in response to a touch on a thumbnail list 801, the specific partial thumbnail 811 is enlarged and output on the entire screen as shown in FIG. 8A(b). At this point, a plurality of dog-ear marks 820a and 820b are displayed on either side of the bottom. When the user flicks the dog-ear mark 820b displayed on the right bottom corner in the opposite direction, the enlarged specific partial thumbnail 811" turns into an image 812 showing a specific hidden figure as shown in FIG. 8A(c), and the dog-ear mark 820*b* displayed on the right bottom corner disappears. Subsequently, when the user flicks the dog-ear mark 820*a* displayed on the left bottom corner in the opposite direction, the image 812 turns into an image 813 showing another specific hidden figure and the dog-ear mark 820*a* displayed on the left bottom corner disappears. The folded part may be unfolded with an animation effect that makes it look as if paper is unfolded.

In a third embodiment, when the chosen thumbnail is enlarged to a predetermined size, the controller 180 may further output a dog-ear mark in one area of the enlarged image, and make a request for encryption key input to change the enlarged image into the original image, in response to touch input in the direction indicated by the dog-ear mark. If an input encryption key matches a preset password, the enlarged image turns into the original image.

Figure 8B:
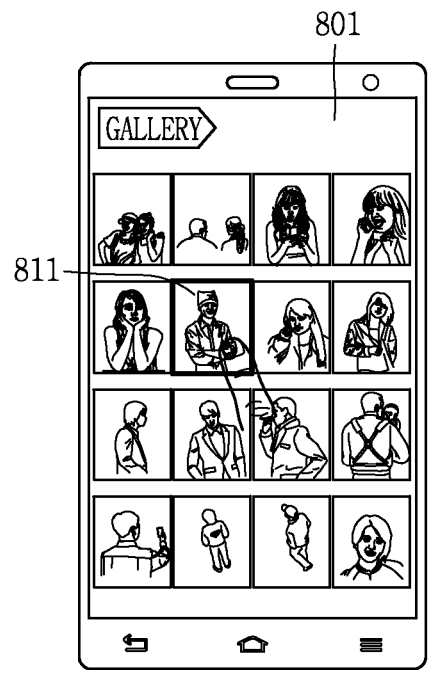
Figure 8B:
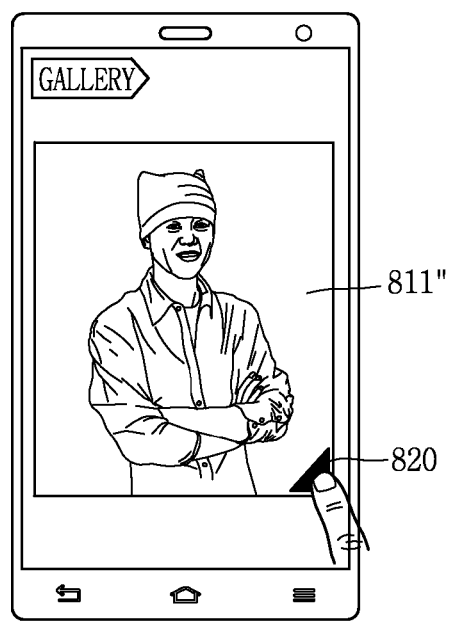
Figure 8B:
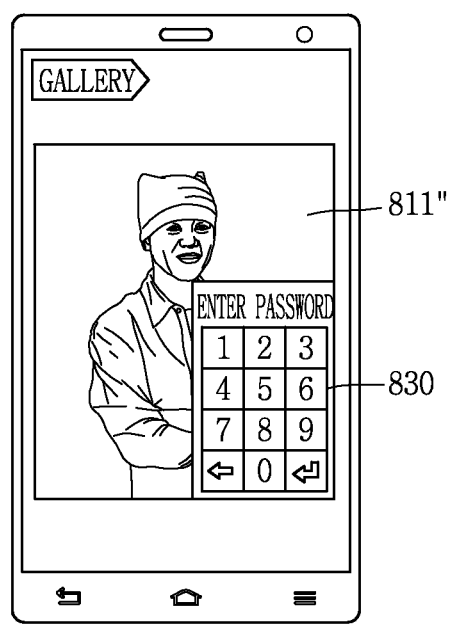
Figure 8B:
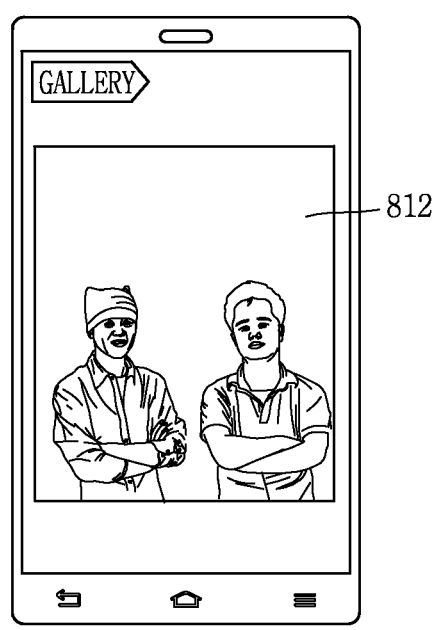

For example, if the user flicks the dog-ear mark in one direction as shown in FIG. 8B(b), a password pop-up 830 for entering a password in Arabic is displayed. If the keys entered in the password pop-up 830 match a preset password, the enlarged image 811 turns into the original image 812.

Figure 8C:
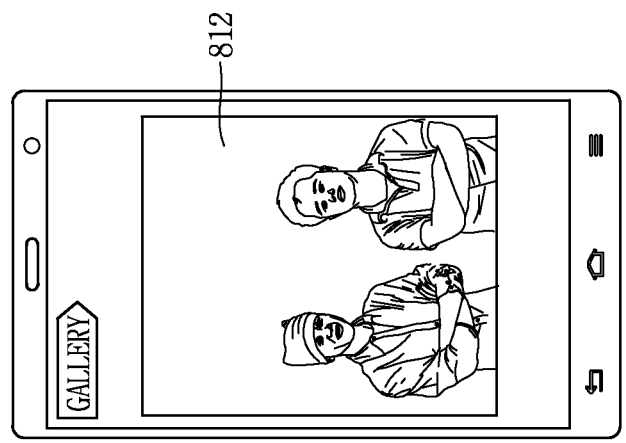
Figure 8C:
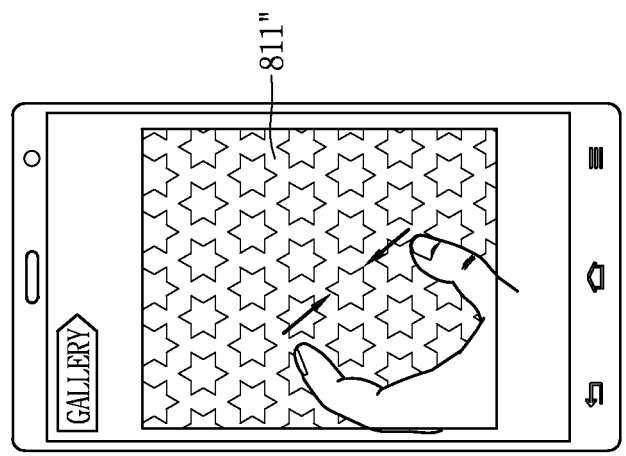
Figure 8C:
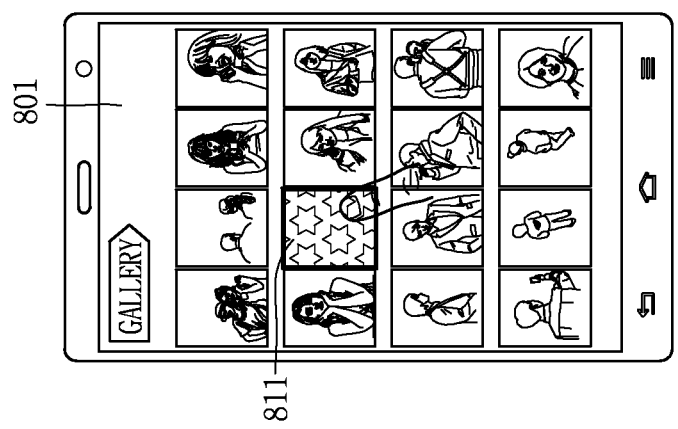

In a fourth embodiment, when the chosen thumbnail is enlarged to a predetermined size, the controller 180 may restore the enlarged image to the original image (referring to FIG. 8C(c)) by applying multi-touch for pinch-out, as shown in FIG. 8C(b).

In a fifth embodiment, the controller 180 may recognize a face contained in the enlarged image. Also, the controller 180 may search for at least one thumbnail containing the recognized face and sequentially output it in an area distinct from the area displaying the enlarged image, for example, on the bottom. Accordingly, the user can get photo images containing the same person without any particular manipulation.

It is needless to say that at least one combination of the above-described first to fifth embodiments of the present invention is applicable to a single image or multiple images.

The mobile terminal according to the embodiment of the present invention includes at least one camera 121 for image capture. The user usually takes repeated shots of the same scene when capturing with a camera. In this case, the corresponding thumbnail is created for each photo image. Thus, if there are many similar images, this causes the inconvenience of having to do repeated touches in order to find a specific photo image in a thumbnail list.

Figure 9A:
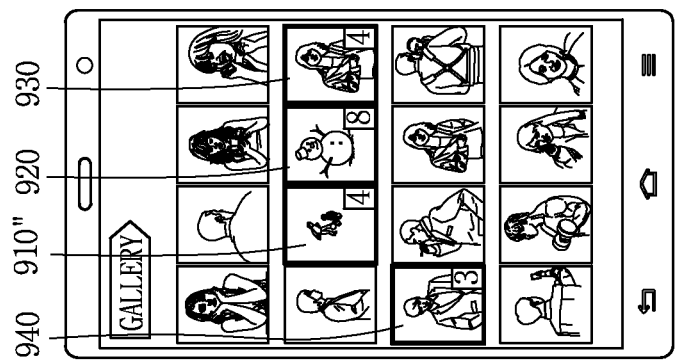
FIGS. 9A(a) to 9C(c) are conceptual diagrams for explaining a method of grouping multiple images and displaying them as a thumbnail according to an embodiment of the present invention.
Figure 9A:
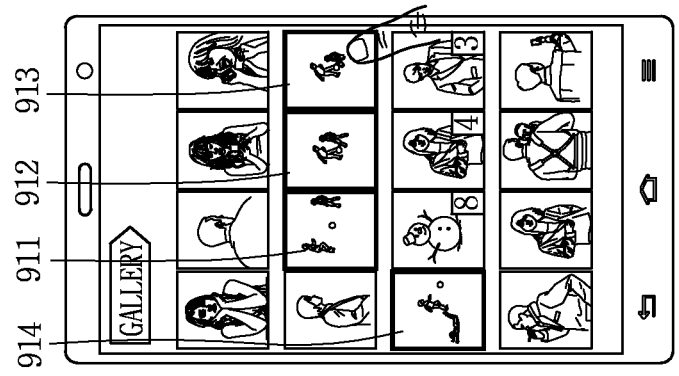
Figure 9A:
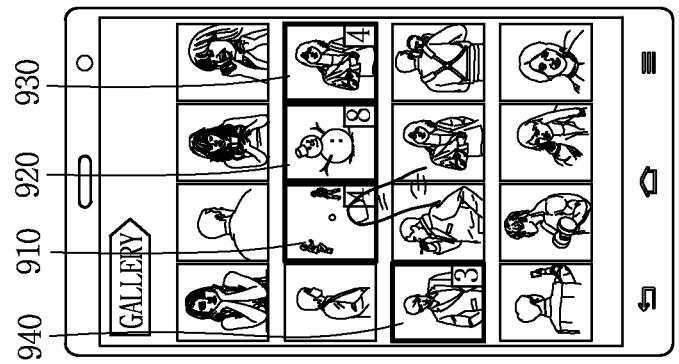

Referring to FIGS. 9A(a) to 9C(c), a method of grouping multiple images to create and display a desired specific image as a thumbnail will be described in more detail below.

Specifically, the controller 180 may group multiple images associated with a specific image into a group according to a defined criterion.

The defined criterion may involve similarity in background, object, figure, and color, or the defined criterion may involve the range within which the user drags on the thumbnail list resulting from the execution of the image preview function.

If the defined criterion is dependent on similarity, the controller 180 may analyze chronologically saved images. To this end, if multiple images share at least one common element, including a subject forming a specific image, the surrounding environment (background) of the subject, figures and objects contained in the specific image, and what circumstance (day or night) the background is in, the state of motion of the figures and objects, the time when the image is captured or saved, and the like, the extractor 182 may assign a higher weight value to more common elements, choose multiple images with high similarity, and combine them into a group.

Next, the controller 180 may create a group thumbnail for this group from the specific image or a specific area of the specific image, based on a touch gesture on the specific image belonging to the same group.

The touch gesture on the specific image may be the same as or similar to those in the above-explained examples.

When the image preview function is executed, the controller 180 outputs a thumbnail list that displays the group thumbnail in a way that is visually distinct from other thumbnails.

When the image preview function is executed, the controller 180 may display visual information indicating the number of images in the group (e.g., an icon indicating the number of images included in the group in Arabic numerals) on the created group thumbnail.

When the group thumbnail is chosen from the thumbnail list resulting from the execution of the image preview function, the controller 180 may control the thumbnails corresponding to the multiple images included in the chosen group thumbnail to be spread out on the thumbnail list. That is, if the above-described partial thumbnails or the thumbnails of other images are chosen, the chosen thumbnails are enlarged for display; whereas if the group thumbnail is chosen, all the thumbnails of multiple images included in the group are displayed.

If any one of the spread-out thumbnails is chosen (the choice may be made by long touch input which is different from the touch input for displaying the enlarged image of this thumbnail), the controller 180 may gather the spread-out thumbnails in the chosen thumbnail, and change the group thumbnail as it was before the spreading into the chosen thumbnail.

For example, as shown in FIG. 9A(a), it can be seen that some thumbnails 910, 920, 930, and 940 of the thumbnail list 901 are group thumbnails. The numbers indicated at the bottom of the group thumbnails 910, 920, 930, and 940 represent the number of other photo images included in the group each of these group thumbnails belongs to. When the user short-touches a specific group thumbnail 910, a plurality of thumbnails 911, 912, 913, and 914 included in the corresponding group are spread out, as shown in FIG. 9A(b). At this point, if the user chooses, i.e., double-touches, a specific one 913 of the spread-out thumbnails, the chosen specific thumbnail 913 is changed into a group thumbnail and the spread-out thumbnails are gathered together, as shown in FIG. 9A(c).

Figure 9B:
Figure 9B:

For another example, as shown in FIG. 9B(a), when the user drags a plurality of other groups, the thumbnails including the drag start point 910 through the drag end point 930 are combined into a large group, and the corresponding group thumbnails 910, 920, and 930 are gathered and displayed together. The number indicated at the bottom of the large group thumbnail 910" is a cumulative value of the numbers indicated on all of the combined group thumbnails. The group thumbnail 910 corresponding to the drag start point serves as a thumbnail of the large group.

For another example, as shown in FIG. 9C(a), when the controller 180 enters the group thumbnail creation mode, a thumbnail lit 910 of all the images belonging to the corresponding group is displayed below the area where a specific image 911 belonging to the corresponding group is output. Based on a touch gesture, the user extracts part of the displayed specific image 911 and part of another image 912 to create one combined image 910*a* as a group thumbnail.

As explained above, similar images are grouped to display only one representative thumbnail when showing saved images in thumbnails, thereby reducing the total length of a thumbnail list. Accordingly, image display on the display becomes easier, and it takes less movement to find a specific image.

FIGS. 10A(a) to 10B(c) are conceptual diagrams for explaining a method of grouping at least some of multiple images together in a certain area according to an embodiment of the present invention.

In the present invention, the step of displaying at least some of multiple images in a plurality of areas of the display 151 may be performed. The multiple images may be saved in the memory 160. The multiple images may include images captured with the camera equipped in the mobile terminal, images received from an external server via wireless communication, and so on.

To output the images on the display 151 of the mobile terminal, an application associated with image output may be run on the mobile terminal. When the application associated with image output is run, at least some of the multiple images saved in the memory 160 may be displayed on the display 151. For example, as shown in FIG. 10A(a), at least some of the multiple images may be displayed on the display 151.

In the present invention, the step of grouping at least two of the multiple images together in any one of the plurality of areas may be performed when at least some of the multiple images are displayed on the display 151.

The display 151 may include a plurality of areas. At least some of the multiple images may be displayed in the plurality of areas. The user may do scroll in order to view images other than the at least some images displayed on the display 151.

If there are too many multiple images, the user will have to find a desired image from these images while moving all the images.

To overcome this problem, the controller 180 may allow at least two of the multiple images to be grouped together in any one of the plurality of areas. The at least two images may be images associated with each other. For example, the at least two images may be images that satisfy a predetermined condition or images that are chosen by the user.

The predetermined condition may be at least one of the following: image capture time, image capture location, information on figures in an image, image size, and image similarity. Also, the predetermined condition may be various information related to an image. That is, the predetermined condition may be metadata, tag information, etc related to an image.

The predetermined condition may be chosen or predetermined by the user. For example, the user may set up the predetermined condition as image similarity so that images to be grouped together in a certain area are chosen by image similarity. Image similarity may be detected using an image detection technique.

Moreover, the at least two images may be set by the user. For example, the user may set images to be associated with a certain area by applying a predetermined type of touch on at least two of the multiple images.

A certain area where the at least two images are grouped together may be any one of the areas where the at least two images are displayed. Also, the certain area may be set arbitrarily.

For example, as shown in FIG. 10A(b), the controller 180 may detect similar images from multiple images. Afterwards, the controller 180 may allow the detected images to be grouped together in a certain area.

The detected similar images may be set up as a plurality of groups including at least two images. In this case, each of these groups may be displayed in a different area. For example, as shown in FIG. 10A(b), the controller 180 may detect four groups 300a, 310a, 320a, and 330a. These four groups may be displayed in different four areas, respectively.

The controller 180 may output at least two images in a certain area in various manners.

For example, as shown in FIG. 10A(c), the controller 180 may display a representative one of the at least two images in the certain area. The representative image may be one of the at least two images that are grouped together in the certain area.

The representative image may be predetermined or set by the user. Also, the controller 180 may display the detected groups as representative images 300b, 310b, 320b, and 330b in different areas.

The rest of the at least two images, other than the representative image, may not be displayed anymore on the display 151. That is, in the present invention, the user does not have to scroll much in order to view images since the number of areas where at least two similar images are displayed can be reduced.

Figure 10B:
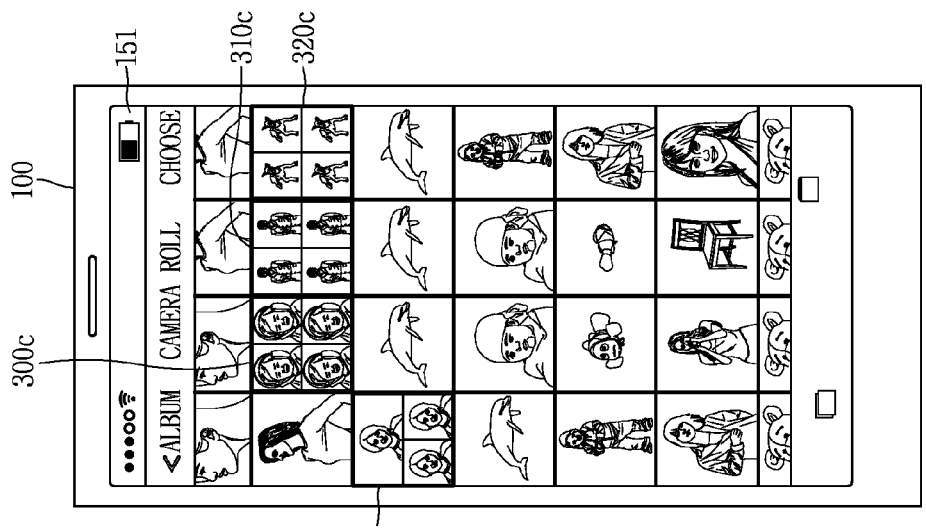
FIGS. 10A(a) to 10B(c) are conceptual diagrams for explaining a method of grouping at least some of multiple images together in a certain area according to an embodiment of the present invention.
Figure 10B:
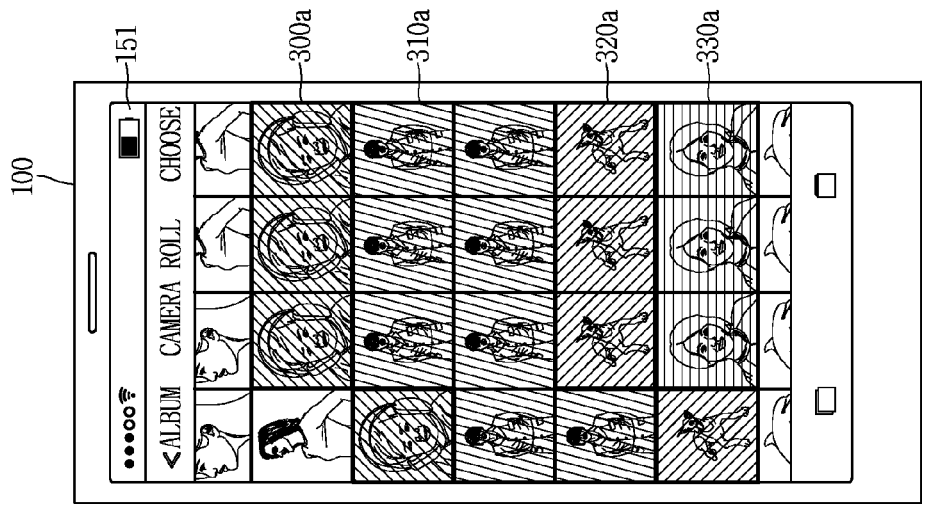
Figure 10B:
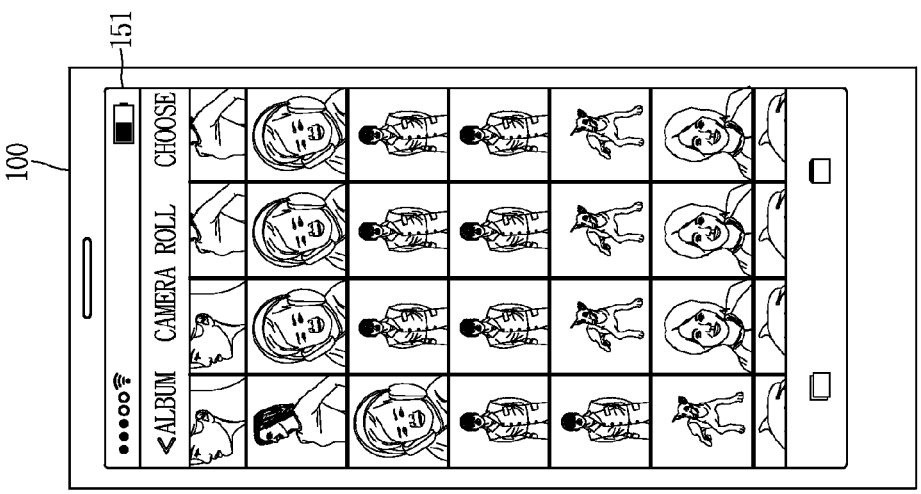

For another example, as shown in FIG. 10B(c), the controller 180 may display some of the at least two images in the certain area. That is, the controller 180 may divide the certain area by the number of images to be displayed in the certain area, and display reduced images 300c, 310c, 320c, and 330c in the divided areas.

For example, if four images are made to be displayed in a group in a certain area, the controller 180 may divide the certain area into four and display reduced versions of the four images in the divided areas, respectively.

Once the at least two images are grouped together in a certain area, the locations where the rest of the multiple images are displayed may be changed. For example, as shown in FIG. 10A(a) to 10A(c) and FIG. 10B(c), when at least two images are grouped together in a certain area, other images may be located in the areas where the at least two images were originally displayed. By doing so, in the present invention, the user does not have to scroll much to view multiple images.

A method of grouping at least two of multiple images in a certain area has been described so far. By this, the present invention provides a more convenient way of presenting associated images.

A variety of methods of choosing at least two of multiple images will be described below. FIGS. 11A(a) to 11C(b) are conceptual diagrams showing a method of choosing at least two images.

If there are multiple images saved in the memory 160, the controller 180 may detect at least two of them based on a predetermined condition. The predetermined condition may be image capture time, image capture location, etc. The predetermined condition may be saved in an image's metadata. The predetermined condition may be a combination of image capture time and image capture location.

For example, the predetermined condition may be image capture time. If some of the multiple images are captured within a reference time period, these images may be set to be displayed in a bundle in a certain area. At this point, as shown in FIG. 11A(b), the controller 180 may group associated ones of the multiple images together based on image capture time.

At least two of the multiple images may be chosen by the user. The user may choose images to display in a bundle in a certain area by applying a predetermined type of touch on at least some of the multiple images. The predetermined type of touch may be various types of touch input, including drag input, flick input, double-tap input, etc.

For example, as shown in FIG. 11B(a), the user may drag at least some of the images displayed on the display 151. In this case, as shown in FIG. 11B(b), the dragged mages may be chosen.

When the dragged images are chosen, the controller 180 may allow these images to be grouped together in any one of the plurality of areas. For example, as shown in FIG. 11B(c), the controller 180 may set up any one of the dragged images as a representative image, and display the representative image in any one of the plurality of areas. The rest of the dragged images may not be displayed anymore on the display 151.

While the controller 180 may allow each individual image to be displayed in a certain area, it also may allow at least two images to be grouped together in a certain area.

Figure 11C:
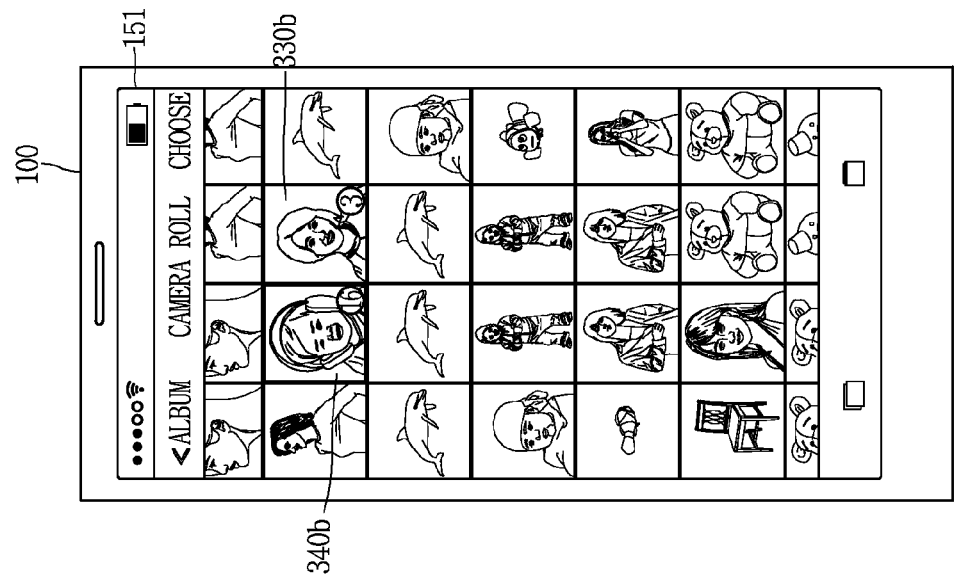
FIGS. 11A(a) to 11C(b) are conceptual diagrams showing a method of choosing at least two images according to an embodiment of the present invention.
Figure 11C:
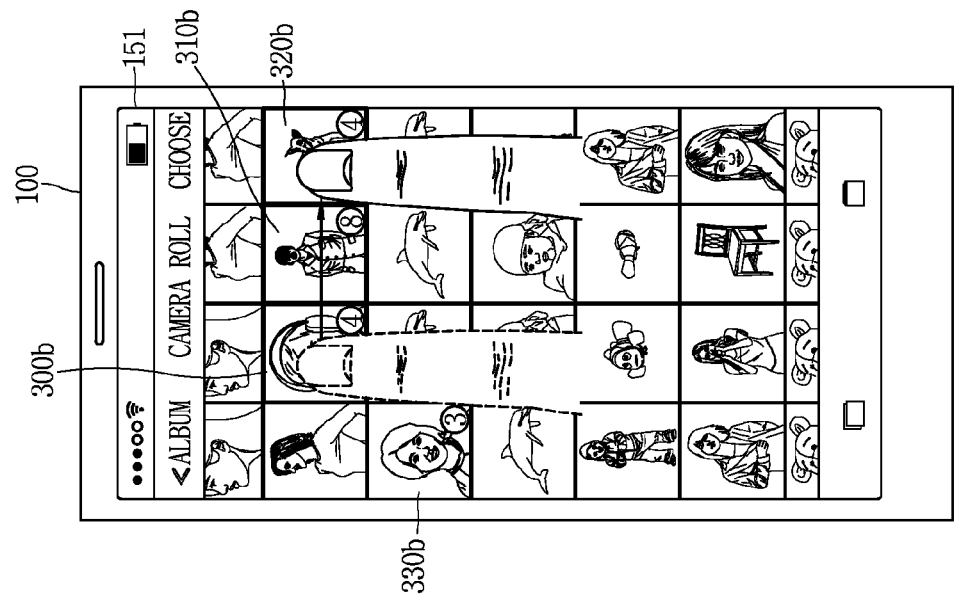

For example, as shown in FIG. 11C(a), at least two associated images may be grouped together in one of the plurality of areas of the display 151.

When the user drags areas respectively including at least two associated images, the controller 180 may allow the associated images in the dragged areas to be grouped together in one area. For example, as shown in FIG. 11C(b), the controller 180 may allow the associated images in the dragged areas 300b, 310b, and 320b to be grouped together in an area 340b.

A method of choosing images to group together in an area has been described so far. By this, the present invention provides the functionality of making the user view multiple images more conveniently.

Figure 12A:
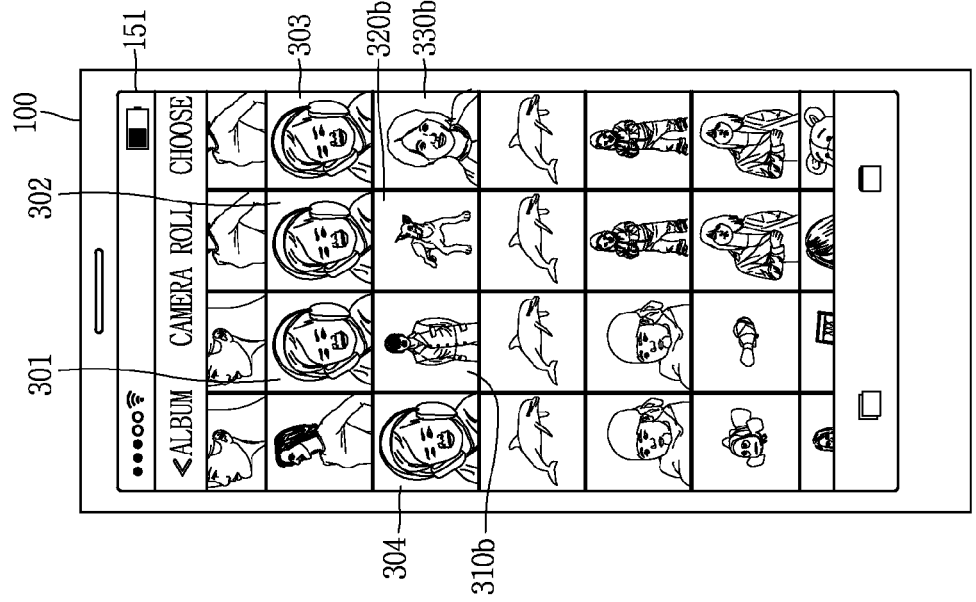
FIGS. 12A(a) to 12B(b) are conceptual diagrams for explaining a method of displaying multiple images included in an area according to an embodiment of the present invention.
Figure 12A:
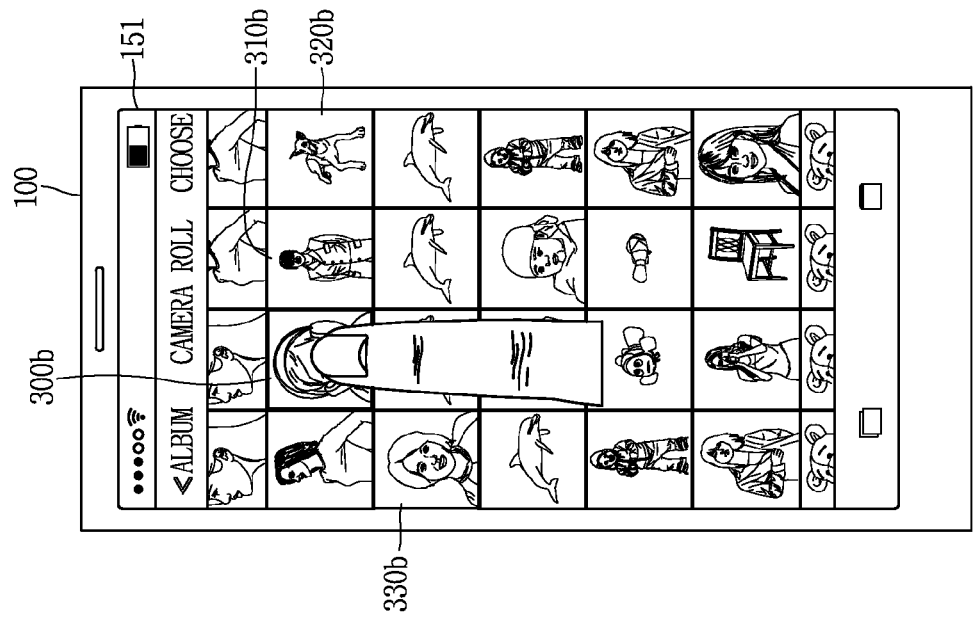

A method of displaying at least two images grouped together in a certain area will be described below. FIGS. 12A(a) to 12B(b) are conceptual diagrams showing a method of outputting at least two images grouped together in a certain area.

If there are at least two images grouped together in a certain area, the controller 180 may allow the at least two images grouped together in the certain area to be displayed altogether on the display 151, in response to a touch on the certain area. By doing so, the user may view the entire images or not as they wish.

For example, as shown in FIG. 12A(a), the controller 180 may display at least two associated images in response to a touch on a certain area with the at least two images. In this case, the at least two images 301, 302, 303, and 304 may be displayed in areas neighboring the certain area.

Meanwhile, images may be displayed in areas other than the certain area on the display 151. If the at least two images are displayed in areas neighboring the certain area, the at least two images may be output in a way that overlaps some images displayed on the display 151.

As shown in FIG. 12A(b), the images displayed in areas neighboring the certain area may be shifted to other locations so that the at least two images 301, 302, 303, and 304 are displayed at these locations.

Figure 12B:
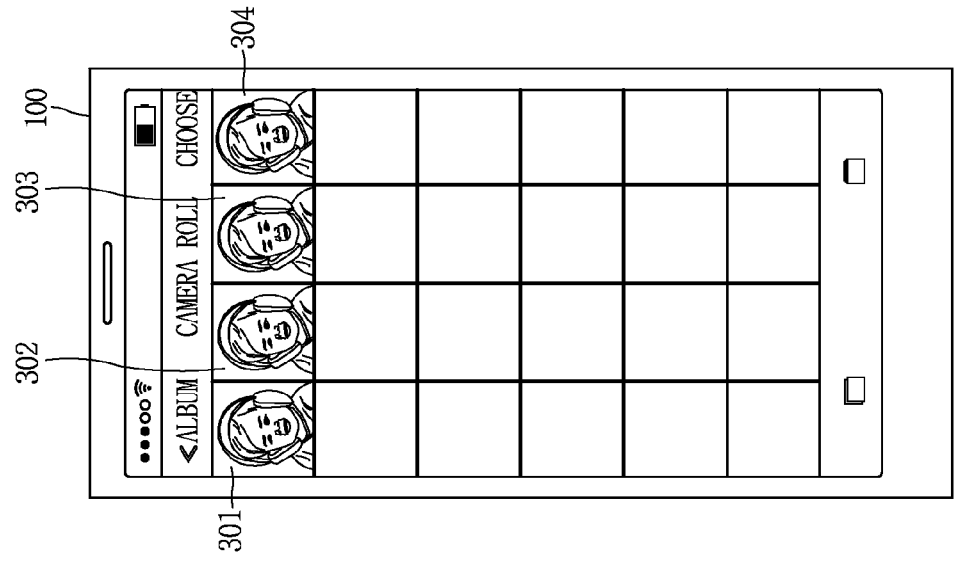
Figure 12B:
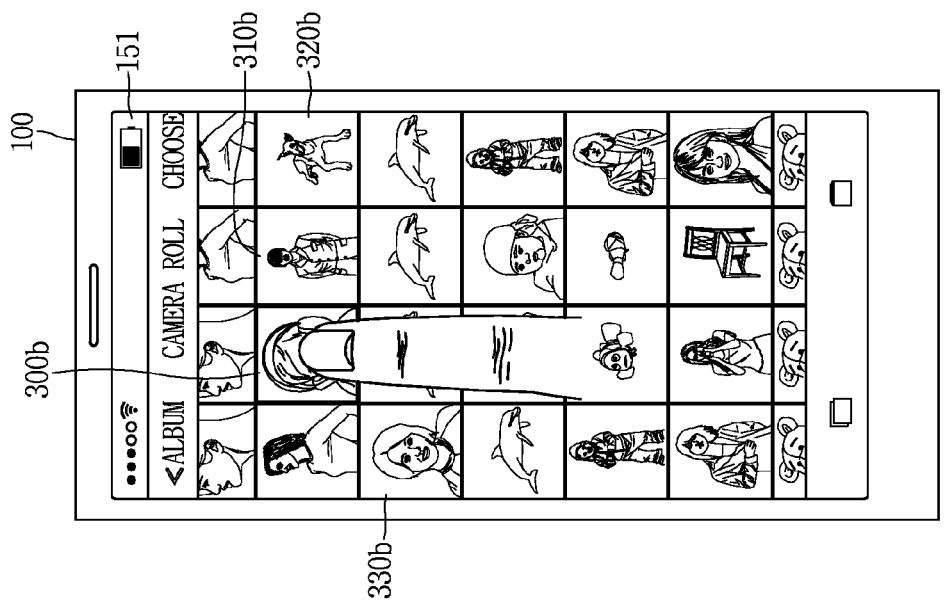

As shown in FIG. 12B(b), only the at least two images 301, 302, 303, and 304 may be displayed on the display 151. That is, the previously displayed images may not be displayed anymore on the display 151. If a control command associated with the undo function is given when only the at least two images 301, 302, 303, and 304 are displayed, the images displayed before the touch on the certain area may be displayed again.

A method of displaying at least two associated images grouped together in a certain area has been described so far. By this, the user can see at least two associated images in various ways.

A method of outputting a graphics object indicating that at least two images are grouped together in a certain area will be described below.

FIG. 13A to 13C are conceptual diagrams showing a method of outputting a graphic object indicating that at least two images are grouped together in a certain area.

If at least two images are grouped together in a certain area, the controller 180 may display a graphics object 600 indicating that the at least two images are grouped together in the certain area.

The graphics object 600 may indicate the number of images grouped together in the certain area. By this, the user is able to know the number of images grouped together in the certain area.

The graphics object 600 may be indicated in a part of the certain area. For example, as shown in FIG. 13C, the graphics object 600 may be indicated at the right bottom corner of the certain area.

Although not shown in the previous figures, the graphics object 600 may be indicated in all of the embodiments explained with reference to the previous figures. The appearance of the graphics object 600 may be changed by a user settings or a mobile terminal setting.

A method of indicating a graphics object indicating the number of images grouped together in a certain area has been described so far.

A method of changing a representative image displayed in a certain area will be described below. FIG. 14A to 14C are conceptual diagrams showing a method of changing a representative image displayed in a certain area.

The controller 180 may display at least two images grouped together on the display 151, in response to a touch on the at least two images. For example, as shown in FIG. 14A, the controller 180 may display images 301, 302, 303, and 304 grouped together in a certain area 300b on the display 151, in response to a touch on the certain area 300b.

In this case, the controller 180 may set up the image touched in a predetermined manner as a representative image. The touch may be a long touch, a double-tap touch, etc. For example, as shown in FIG. 14B, the controller 180 may long-touch any one 303 of the images 301, 302, 303, and 304 grouped together. In this case, any one of these images may be set up as a representative image.

The controller 180 may allow the images 301. 302, 303, and 304 grouped together to be displayed again. As shown in FIG. 14C, the controller 180 may display any one of these images as a representative image in the certain area 300b.

The present invention provides other various methods of choosing a representative image, in addition to the above-explained method.

A method of setting up a representative image to be displayed in a certain area has been described so far. By this, the present invention allows the user to more clearly identify which is which among images grouped together in a certain area.

Figure 15B:
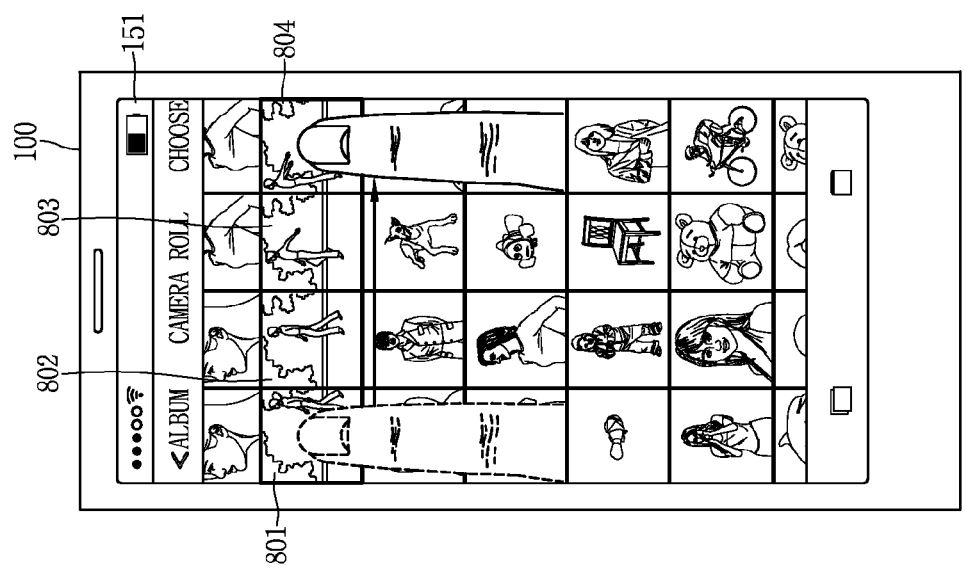
FIGS. 15A and 15B are conceptual diagrams showing a method of editing a representative thumbnail for multiple images according to an embodiment of the present invention.
Figure 15A:
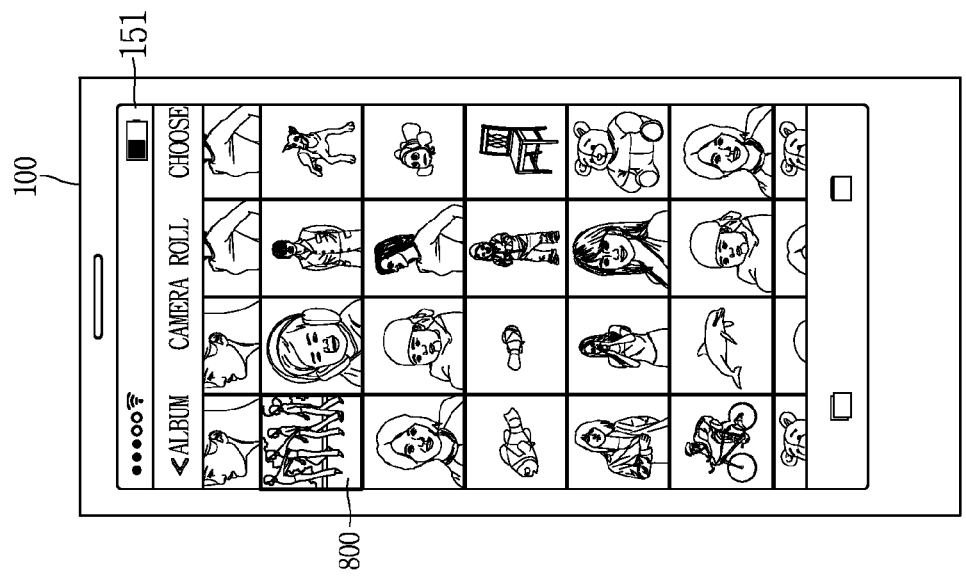

The synthesis of images grouped together in a certain area will be described below. FIGS. 15A and 15B are conceptual diagrams for explaining the synthesis of images grouped together in a certain area.

If there are images 801, 802, 803, and 804 grouped together in a certain area, the controller 180 may synthesize the images 801, 802, 803, and 804 grouped together.

For example, as shown in FIGS. 15A and 15B, the controller 180 may synthesize the images 801, 802, 803, and 804 grouped together.

The method of synthesis used herein may be performed in various ways. For example, the controller 180 may extract figure displaying parts from the images and synthesize the extracted figure displaying parts. For example, as show in FIG. 15B, the controller 180 may extract only figure displaying parts from the images and synthesize them. The image resulting from the synthesis may be defined as a synthesized image. The synthesized image may be stored in the memory 160 and grouped together in the area where the original images were displayed.

The synthesized image may serve as a representative image 800 displayed in a certain area. This makes the user to easily see part of the images grouped together in the certain area.

The present invention provides a method that allows the user to see images more conveniently by grouping together associated images, among multiple images that are not entirely displayed on the display. If there are too many multiple images, this might cause inconvenience to the user when finding a desired image.

Moreover, the present invention can reduce the area occupied by associated images by displaying them in an area. As a result, even if there are too many multiple images, the user can avoid inconvenience when finding a desired image.

In addition, the user can scroll less to display images because associated images are grouped together in an area. Accordingly, the user is able to see all of multiple images more quickly.

A method of creating and displaying a thumbnail of a video image will be described below. FIG. 16A to 16D are views for explaining a method of creating and displaying a thumbnail of a video image according to an embodiment of the present invention.

Figure 16A:
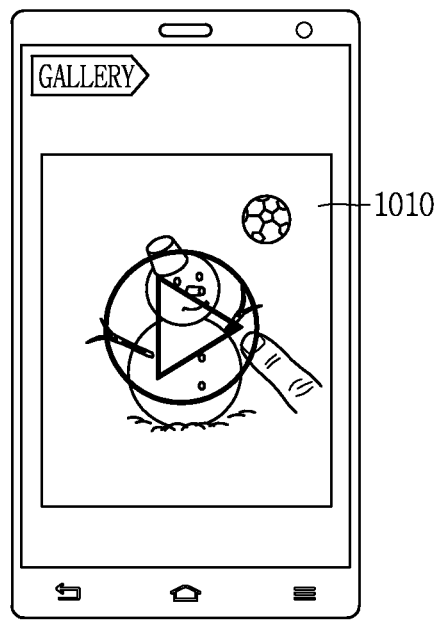
FIG. 16A to 16D are views for explaining a method of creating and displaying a thumbnail of a video image according to an embodiment of the present invention.
Figure 16B:
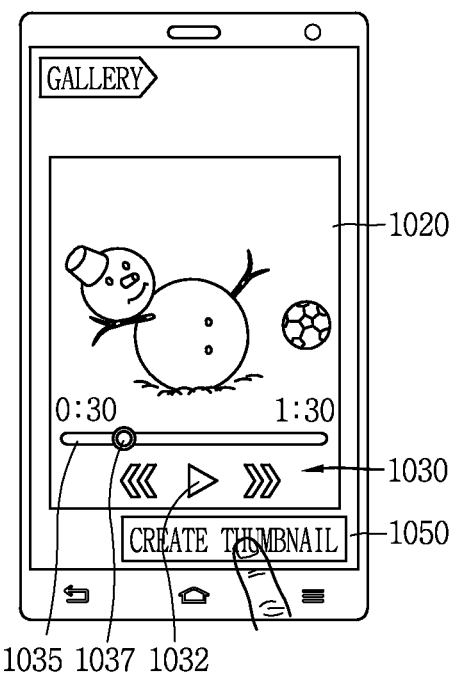

Referring to FIG. 16A, the user may run the gallery application and output a specific video image 1010 on the screen. When the controller 180 enters the thumbnail creation mode and the user touches a 'play' key 1010a displayed at the center of the displayed video image 1010, a video image 1020 that plays as shown in FIG. 16B is output. Then, when the user manipulates a play key 1032 on a screen control menu 1030 that appears when the screen is touched, the video image 1020 is paused. Upon sensing a signal indicative of the pause of the video screen playing in the thumbnail creation mode, a 'create thumbnail' key 1050 is displayed at the bottom of the screen. Then, when the user touches the 'create thumbnail' key 1050, the corresponding video image 1020 turns into a video thumbnail.

When the user touches a moving element 1037 of a time bar indicator 1035 indicating the position of the playing video image in the screen control menu 1030 that appears when the user touches the screen, during the playback of the video image 1020, a thumbnail (not shown) of the video image corresponding to the position indicated by the moving element 1037 is displayed above the moving element 1037. Then, the user may drag and move the moving element 1037 to a desired position and search for a desired scene while viewing the thumbnail (not shown) displayed above the moving element 1037. When a thumbnail (not shown) of the desired scene appears and the user chooses this thumbnail (not shown), the currently playing video image turns immediately into the scene corresponding to the chosen thumbnail. Hereupon, if the user manipulates the play key 1032, the video image is paused, and the scene corresponding to the chosen thumbnail turns into a video thumbnail when the user touches the 'create thumbnail' key 1050.

Figure 16C:
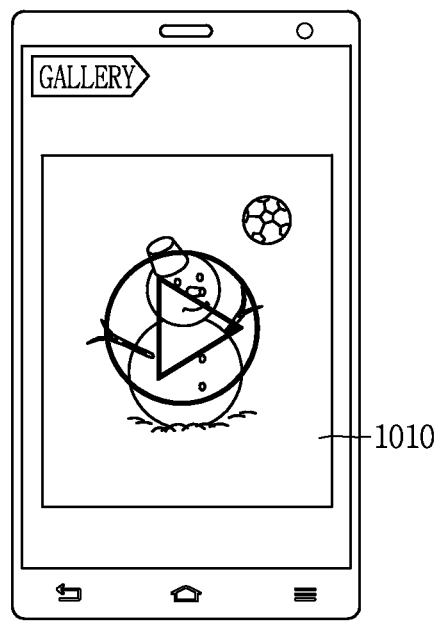
Figure 16D:
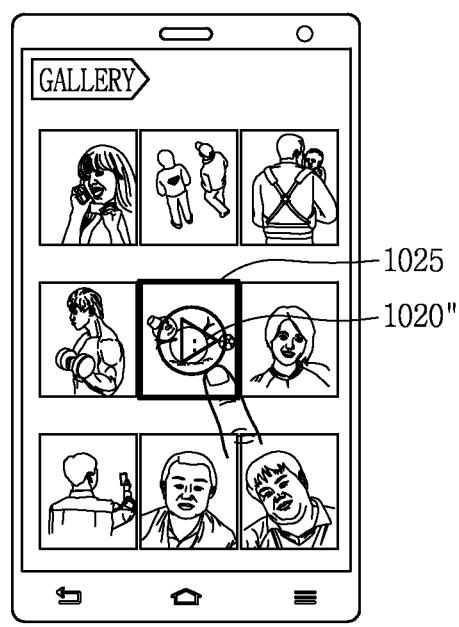

Next, when the image preview function is executed, the paused video scene is displayed as a video thumbnail 1020", as shown in FIG. 16C, and a thick frame for the video thumbnail 1020" is output so as to indicate that the video thumbnail 1020" is created by the user. Hereupon, when the user chooses this thumbnail 1020", the corresponding video may be displayed, starting from the first scene 1010 (or last scene).

As explained above, a mobile terminal and a method for controlling the same according to an embodiment of the present invention offer the convenience of allowing the user to easily identify images saved in the mobile terminal, without exposing objects or figures in the saved images the user does not want to show to others, by displaying only a desired specific part in a thumbnail when showing the saved images as thumbnails. Moreover, it is possible to easily find a thumbnail corresponding to a desired image even if there are too many saved images, because a thumbnail including only a specific part of an image is displayed to be visually distinct from other thumbnails and this thumbnail is used as a breakpoint of scrolling. In addition, the total length of a thumbnail list can be reduced because similar images are grouped to display only one representative thumbnail when showing saved images in thumbnails. Accordingly, image display on the display becomes easier, and it takes less scrolling or movement to find a specific image. In addition, the user can scroll less to display images because associated images are grouped together in an area. Accordingly, the user is able to see all of multiple images more quickly.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a touch screen configured to display first image in an image view mode, the image view mode corresponding to displaying an image stored at the mobile terminal; and
a controller configured to:
extract a first region and a second region from the first image based on a touch gesture applied to the first image when a thumbnail creation mode is executed;
create a first region thumbnail and a second region thumbnail for the corresponding first and second regions and map the first and second region thumbnails to the first image; and
cause the touch screen to display a plurality of thumbnails including the created first and second region thumbnails of the first image when an image preview mode is executed,
wherein the created first and second region thumbnails are distinctly displayed from the remaining thumbnails of the plurality of thumbnails and display of the created first and second region thumbnails is alternated at a same thumbnail display position, and
wherein the first image is originally maintained after creating the first and second region thumbnails and the first image includes an unexposed region that is not included in the created first region thumbnail or the created second region thumbnail.

2. The mobile terminal of claim 1 further comprising a memory, wherein the controller is further configured to:
recognize a face in the specific image, and
cause the display to display a graphics object corresponding to the recognized face, the graphics object indicating a recommended area for the extracted area when the recognized face matches a stored face in the memory.

3. The mobile terminal of claim 1, wherein the extracted area corresponds to:
a first area of the specific image indicated by a touch gesture, wherein the touch gesture indicates that the first area is to be hidden; or
a second area of the specific image other than the first area.

4. The mobile terminal of claim 3, wherein the extracted area corresponds to the first area, and the controller is further configured to:
recognize a face in the first area; and
create the thumbnail image comprising the first area as a first type thumbnail image when the recognized face corresponds to a first face group; or
create the thumbnail image comprising the first area as a second type thumbnail image when the recognized face corresponds to a second face group.

5. The mobile terminal of claim 4, wherein the controller is further configured to:
cause the display to hide the recognized face when the plurality of thumbnail images is displayed when the recognized face corresponds to the first face group; and
cause the display to display the recognized face when the plurality of thumbnail images is displayed when the recognized face corresponds to the second face group.

6. The mobile terminal of claim 1, wherein the controller is further configured to:
cause the display to display related information of an object in the thumbnail image when the created thumbnail image is displayed in the image gallery mode.

7. The mobile terminal of claim 6, wherein the object corresponds to a recognized face, and the controller is further configured to:
cause the display to display profile information stored in a memory, the profile information corresponding to the recognized face.

8. The mobile terminal of claim 1, wherein the controller is further configured to cause the display to display the created thumbnail in a size larger than a size of the remaining thumbnail images of the plurality of thumbnail images.

9. The mobile terminal of claim 1, wherein the controller is further configured to:
cause the display to display the created thumbnail image proximate to a center of the displayed plurality of thumbnail images; and
rearrange the displayed plurality of thumbnail images after a threshold period of time to be displayed in an original order of the displayed plurality of thumbnail images.

10. The mobile terminal of claim 1, wherein the controller is further configured to:
scroll the displayed plurality of thumbnail images in the image gallery mode in response to a scrolling input; and
stop scrolling the displayed plurality of thumbnail images or decrease the speed of scrolling when the created thumbnail image enters a predetermined region.

11. The mobile terminal of claim 1, wherein the controller is further configured to:
cause the display to enlarge the created thumbnail image to an enlarged size in response to an input selecting the created thumbnail image in the image gallery mode; and
change the enlarged created thumbnail image to the specific image after a threshold length of time.

12. The mobile terminal of claim 1, wherein the controller is further configured to cause the display to:
enlarge the created thumbnail image to an enlarged size in response to an input selecting the created thumbnail image in the image gallery mode; and
display a corner indicator in a first area of the enlarged created thumbnail image after a threshold length of time.

13. The mobile terminal of claim 12, wherein the controller is further configured to change the enlarged created thumbnail image to the specific image in response to a touch input in a direction indicated by the displayed corner indicator.

14. The mobile terminal of claim 13, wherein the controller is further configured to:
recognize a face in the enlarged thumbnail image; and
cause the display to display a related thumbnail image comprising the recognized face, the related thumbnail image displayed in a first region distinct from a second region where the enlarged thumbnail image is displayed.

15. The mobile terminal of claim 1, wherein the controller is further configured to:
group one or more related images with the first image in a group of images based on a predetermined grouping criterion; and
create a group thumbnail from a selected partial area of the first image in response to a touch input to the first image in the thumbnail creation mode.

16. The mobile terminal of claim 15, wherein the controller is further configured to cause the touch screen to display:

the group thumbnail in the image preview mode; and information on the displayed group thumbnail indicating a number of images included in the group of images.

17. The mobile terminal of claim 15, wherein:

the predetermined grouping criterion is based on a type of touch input to the one or more related images and the first image; and the controller is further configured to cause the touch screen to display the group thumbnail in the image preview mode to be distinctly displayed from the other plurality of thumbnails and the first and second region thumbnails.

18. The mobile terminal of claim 15, wherein the controller is further configured to cause the touch screen to display:

the group thumbnail in the image preview mode; and individual thumbnails corresponding to the grouped images consecutively in the image preview mode in response to an input selecting the displayed group thumbnail.

19. The mobile terminal of claim 18, wherein the controller is further configured to:

cause the touch screen to stop displaying the individual thumbnail; and change the group thumbnail image to a selected one of the individual thumbnail in response to a selection of the one individual thumbnail.

20. A method for controlling a mobile terminal, the method comprising:

displaying, on a touch screen of the mobile terminal, a first image in an image view mode, the image view mode corresponding to displaying an image stored at the mobile terminal;

extracting, by a controller of the mobile terminal, a first region and a second region from the first image based on a touch gesture applied to the first image when a thumbnail creation mode is executed;

creating, by the controller, a first region thumbnail and a second region thumbnail for the corresponding first and second regions and mapping the first and second region thumbnails to the first image; and displaying a plurality of thumbnails including the created first and second region thumbnails when an image preview mode is executed, wherein the created first and second region thumbnails are distinctly displayed from the remaining thumbnails of the plurality of thumbnails and display of the created first and second region thumbnails is alternated at a same thumbnail display position, and wherein the first image is originally maintained after creating the first and second region thumbnails and the first image includes an unexposed region that is not included in the created first region thumbnail or the second region thumbnail.

* * * * *